(12) United States Patent
Kim

(10) Patent No.: US 11,169,704 B1
(45) Date of Patent: Nov. 9, 2021

(54) MOBILE TERMINAL FOR DISPLAYING CONTENT ON FLEXIBLE DISPLAY AND CONTROL METHOD THEREOF

(71) Applicant: LG ELECTRONICS INC., Seoul (KR)

(72) Inventor: Changmok Kim, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 0 days.

(21) Appl. No.: 17/035,543

(22) Filed: Sep. 28, 2020

(51) Int. Cl.
*G06F 3/0488* (2013.01)
*G06F 3/0481* (2013.01)
*G06F 1/16* (2006.01)
*H04M 1/72463* (2021.01)

(52) U.S. Cl.
CPC ........ *G06F 3/04886* (2013.01); *G06F 1/1624* (2013.01); *G06F 1/1652* (2013.01); *G06F 3/04812* (2013.01); *G06F 3/04817* (2013.01); *H04M 1/72463* (2021.01)

(58) Field of Classification Search
CPC .. G06F 3/04886; G06F 1/1624; G06F 1/1652; G06F 3/04812; G06F 3/04817; H04M 1/72577
See application file for complete search history.

(56) References Cited

U.S. PATENT DOCUMENTS 9,173,306 B2   10/2015   Lim et al.
9,350,836 B2    5/2016   Song
2014/0053097 A1    2/2014   Shin et al.
2015/0378393 A1*  12/2015   Erad .................... G06F 1/1647
                                                                    345/1.3
2017/0052698 A1*   2/2017   Seo .................... H04M 1/72519

FOREIGN PATENT DOCUMENTS

KR   1020110129750   12/2011
KR   1020140023679    2/2014
KR      101917683    11/2018
KR      20190101184    8/2019

OTHER PUBLICATIONS

PCT International Application No. PCT/KR2020/005494, International Search Report dated Jan. 22, 2021, 4 pages.

* cited by examiner

*Primary Examiner* — Yaron Cohen
(74) *Attorney, Agent, or Firm* — Lee, Hong, Degerman, Kang & Waimey

(57) ABSTRACT

Provided is a mobile terminal including a display located at a first side and a second side of the mobile terminal such that a size by which the display is located at the first side is changeable, the second side facing the first side, and a controller. The controller may display first content of a first application in a first area of the display located at the first side and display second content of a second application in a second area of the display located at the first side, arrange at least a portion of the first area of the display on another side, and display the first content of the first application in at least a portion of the second area when a first input related to the first application is received.

19 Claims, 23 Drawing Sheets

FIG. 2
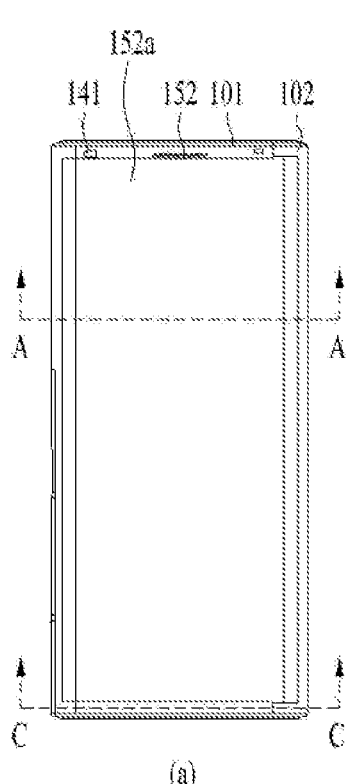
(a)
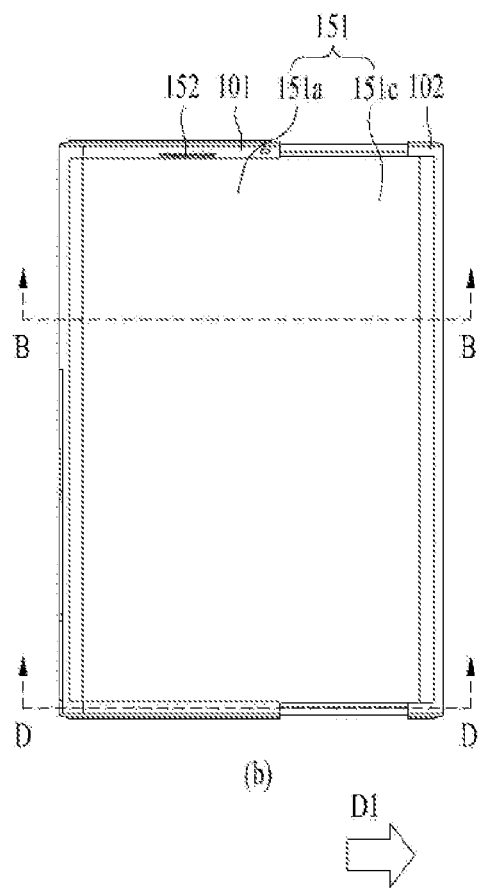
(b)
D1

FIG. 6
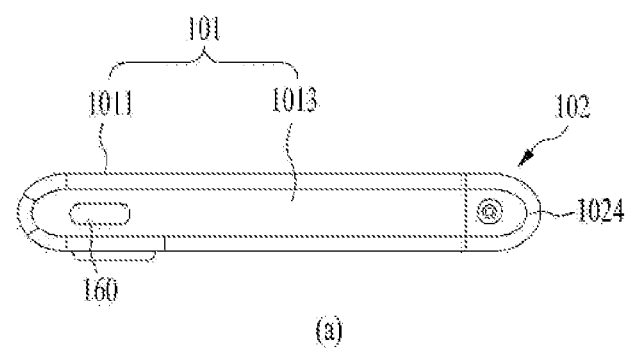
(a)
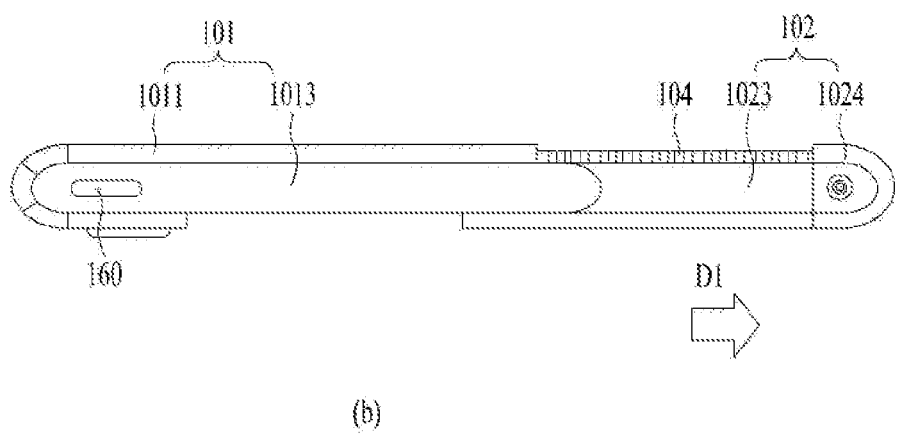
(b)

FIG. 7
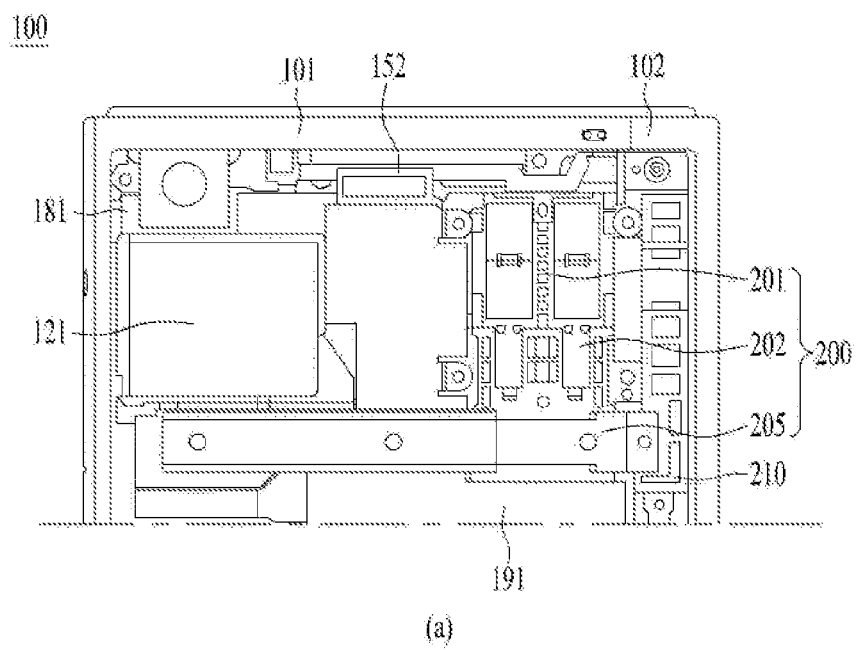
(a)
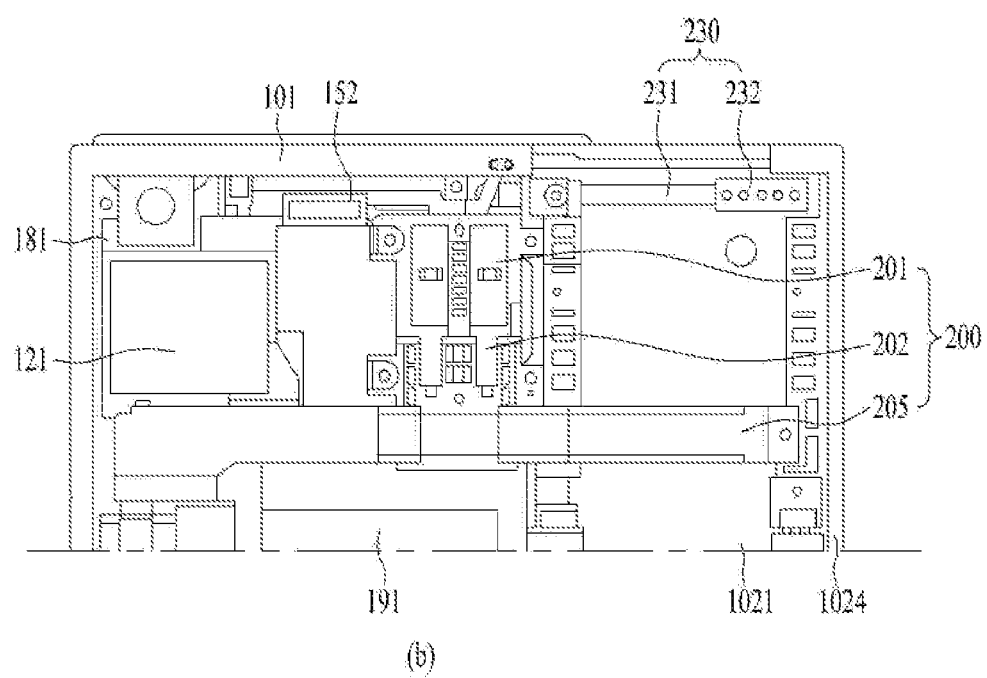
(b)

FIG. 8
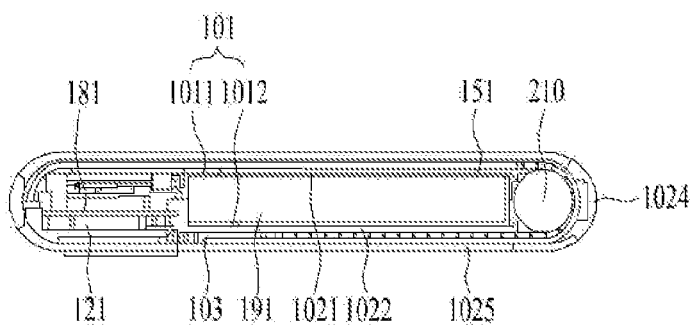
(a)
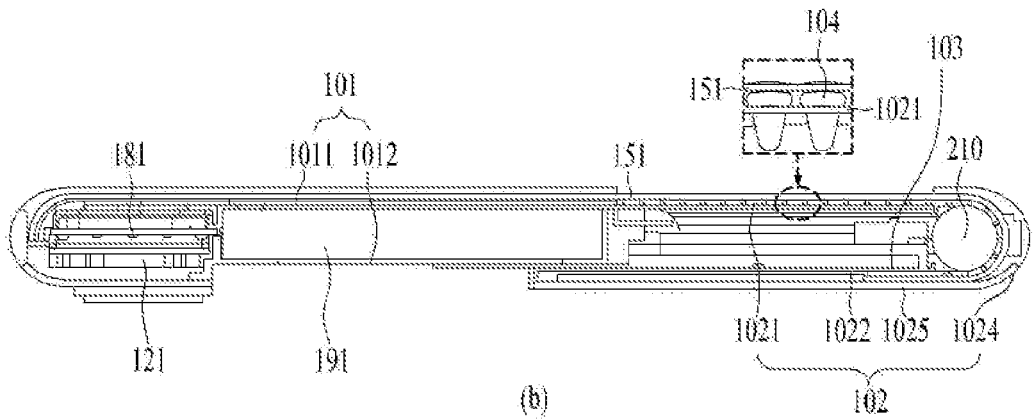
(b)

MOBILE TERMINAL FOR DISPLAYING CONTENT ON FLEXIBLE DISPLAY AND CONTROL METHOD THEREOF

CROSS-REFERENCE TO RELATED APPLICATION(S)

Pursuant to 35 U.S.C. § 119 (a), this application claims the benefit of an earlier filing date and right of priority to International Application No. PCT/KR2020/005494 filed on Apr. 27, 2020, the contents of which are hereby incorporated by reference herein in its entirety.

BACKGROUND

1. Field

This disclosure relates to a mobile terminal for displaying content of an application and a control method thereof. One particular implementation relates to a mobile terminal for displaying content of an application in an area corresponding to an input received on a display based on the input, and a control method thereof.

2. Description of the Related Art

Advances of network technologies and expansions of infrastructures have enabled an electronic device to perform various and professional tasks. In this regard, there has been an increasing desire for an electronic device with a display that displays content on a large screen.

However, a display providing a large screen may increase in size in proportion to a screen size. Thus, it is necessary to consider a portability along with a size of the display in terms of an electronic device of which the portability is emphasized, such as a mobile terminal.

For this, there can be considered a method to change a size of a display as necessary by applying a foldable or rollable display having a sufficient elasticity to the electronic device. For example, a portion of a display may be rolled up to a rear side of a mobile terminal, and rolled out or moved as necessary such that an exposed area of the display increases.

When the size of the display is changed, a content display area may also be changed to correspond to the change in size. For example, while content is displayed on a front side of the mobile terminal, a portion of the front side may be rolled to a rear side so a front-side exposed display size is changed. In this example, a size of an area displaying the content may be changed based on the change of the display size. Therefore, there is a desire for a method to effectively provide content by reflecting a size change of a display in consideration of a user's convenience of use.

SUMMARY

An aspect provides a mobile terminal for providing content and a control method thereof. The mobile terminal may display content of an application in an area corresponding to a received input when a display of the mobile terminal is changed in size, thereby reflecting user's needs and achieving increased efficiency in providing content.

Technical goals of the present disclosure are not limited as mentioned above and, although not mentioned, may include goals that can be clearly understood by those skilled in the art to which the present disclosure pertains, from the following description.

According to an aspect, there is provided a mobile terminal including a display and a controller. The display is located at a first side and a second side of the mobile terminal such that a size by which the display is located at the first side is changeable, the second side facing the first side. The controller is configured to display first content of a first application in a first area of the display located at the first side and display second content of a second application in a second area of the display located at the first side, arrange at least a portion of the first area of the display on another side, and display the first content of the first application in at least a portion of the second area when a first input related to the first application is received.

According to another aspect, there is also provided a method of controlling a mobile terminal. The mobile terminal includes a display located at a first side and a second side of the mobile terminal such that a size by which the display is located at the first side is changeable, the second side facing the first side. The method includes displaying first content of a first application in a first area of the display located at the first side and displaying second content of a second application in a second area of the display located at the first side, arranging at least a portion of the first area of the display on another side, and displaying the first content of the first application in at least a portion of the second area when a first input related to the first application is received.

BRIEF DESCRIPTION OF THE DRAWINGS

The above and other aspects, features, and advantages of certain embodiments will be more apparent from the following detailed description taken in conjunction with the accompanying drawings, in which:

FIG. 2 illustrates front views of a mobile terminal in a first state and a second state according to an example embodiment;

FIG. 6 illustrates side views of a mobile terminal from a third direction according to an example embodiment;

FIG. 7 illustrates a driving part of a mobile terminal according to an example embodiment;

FIG. 8 illustrates cross-sectional views taken along lines A-A and B-B of FIG. 2;

DETAILED DESCRIPTION

Figure 1:
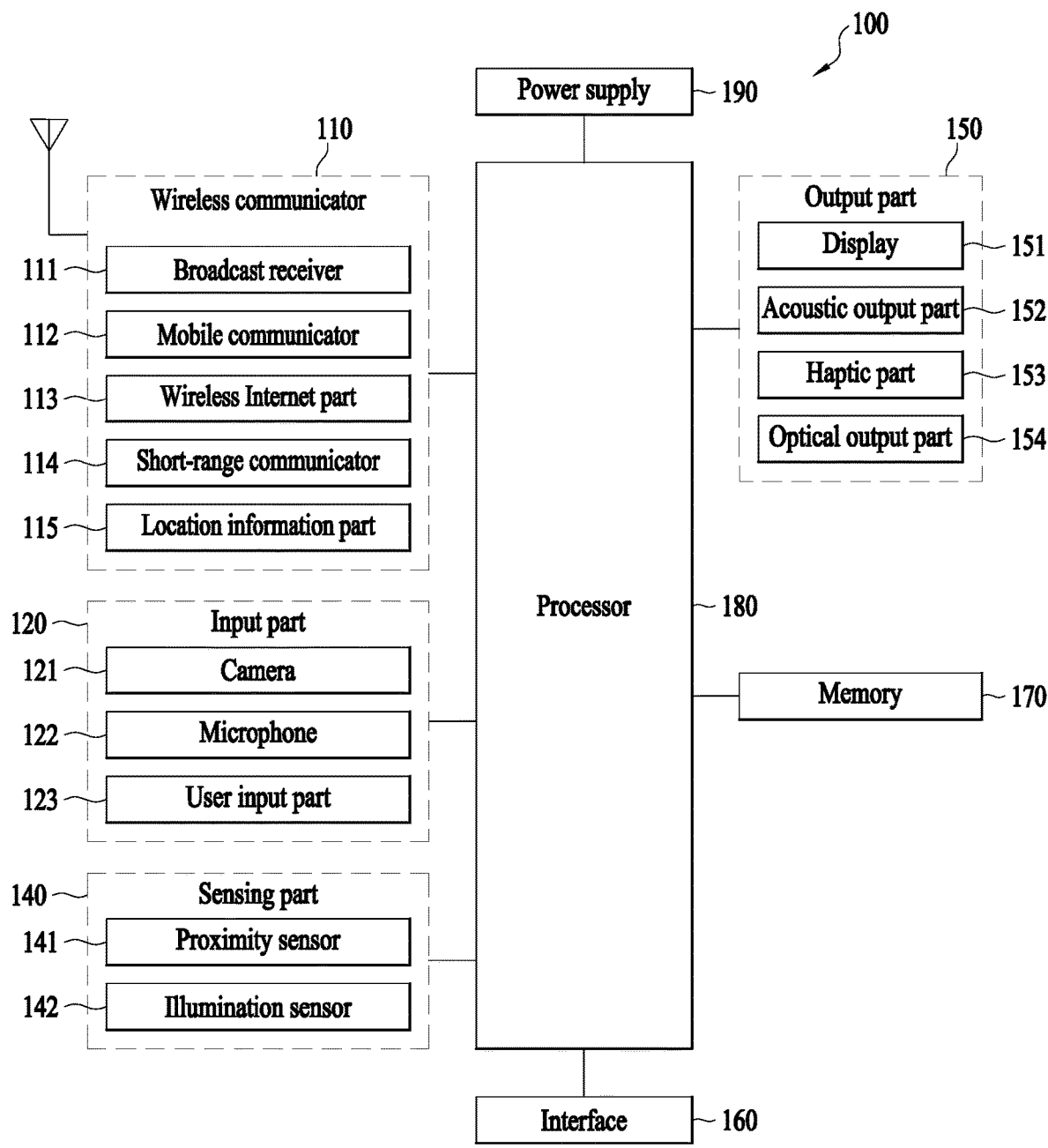
FIG. 1 is a block diagram illustrating a mobile terminal.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating a mobile terminal (or electronic device) 100 related to an example embodiment of the present disclosure. The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

Figure 3:
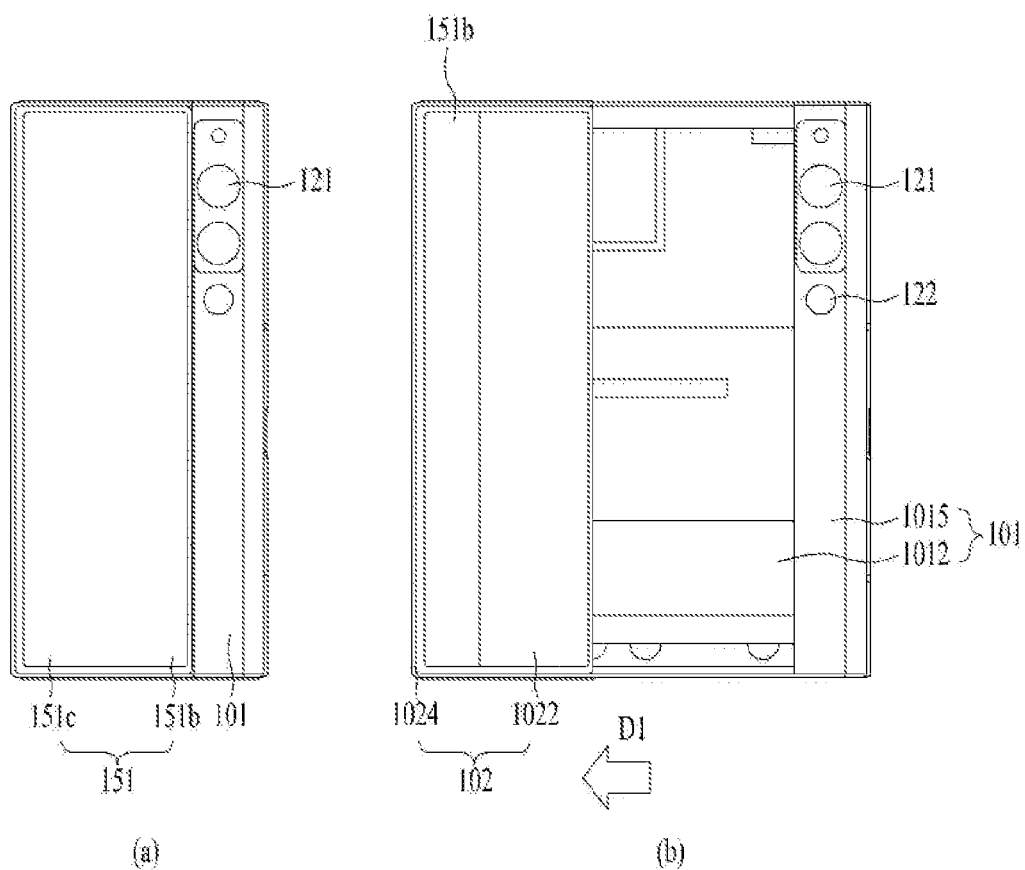
FIG. 3 illustrates rear views of a mobile terminal in a first state and a second state according to an example embodiment.

FIG. 2 illustrates front views of a mobile terminal in a first state and a second state, and FIG. 3 illustrates rear views of the mobile terminal in the first state and the second state. (a) of FIG. 2 and (a) of FIG. 3 illustrate the first state in which the mobile terminal is retracted. (b) of FIG. 2 and (b) of FIG. 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a display's portion located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color.

When the external force is applied to the flexible display 151, the flexible display 151 may be changed from a flat state which is the default state to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection means that detects a deformation of the flexible display 151. The deformation detection means may be included in the sensing part 140 of FIG. 1.

The deformation detection means may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection means, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection means of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
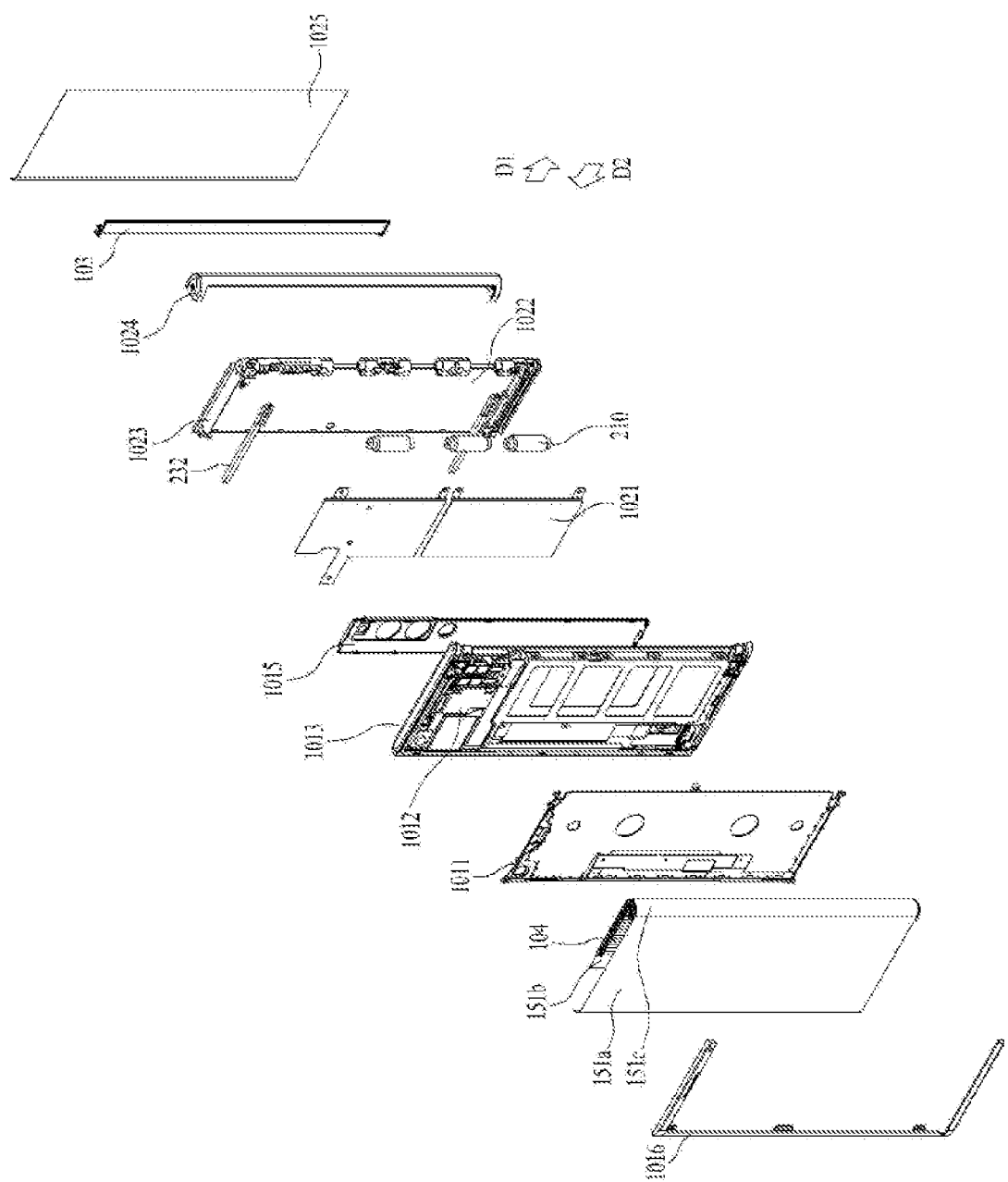
FIGS. 4 and 5 are exploded perspective views illustrating a mobile terminal according to an example embodiment.
Figure 5:
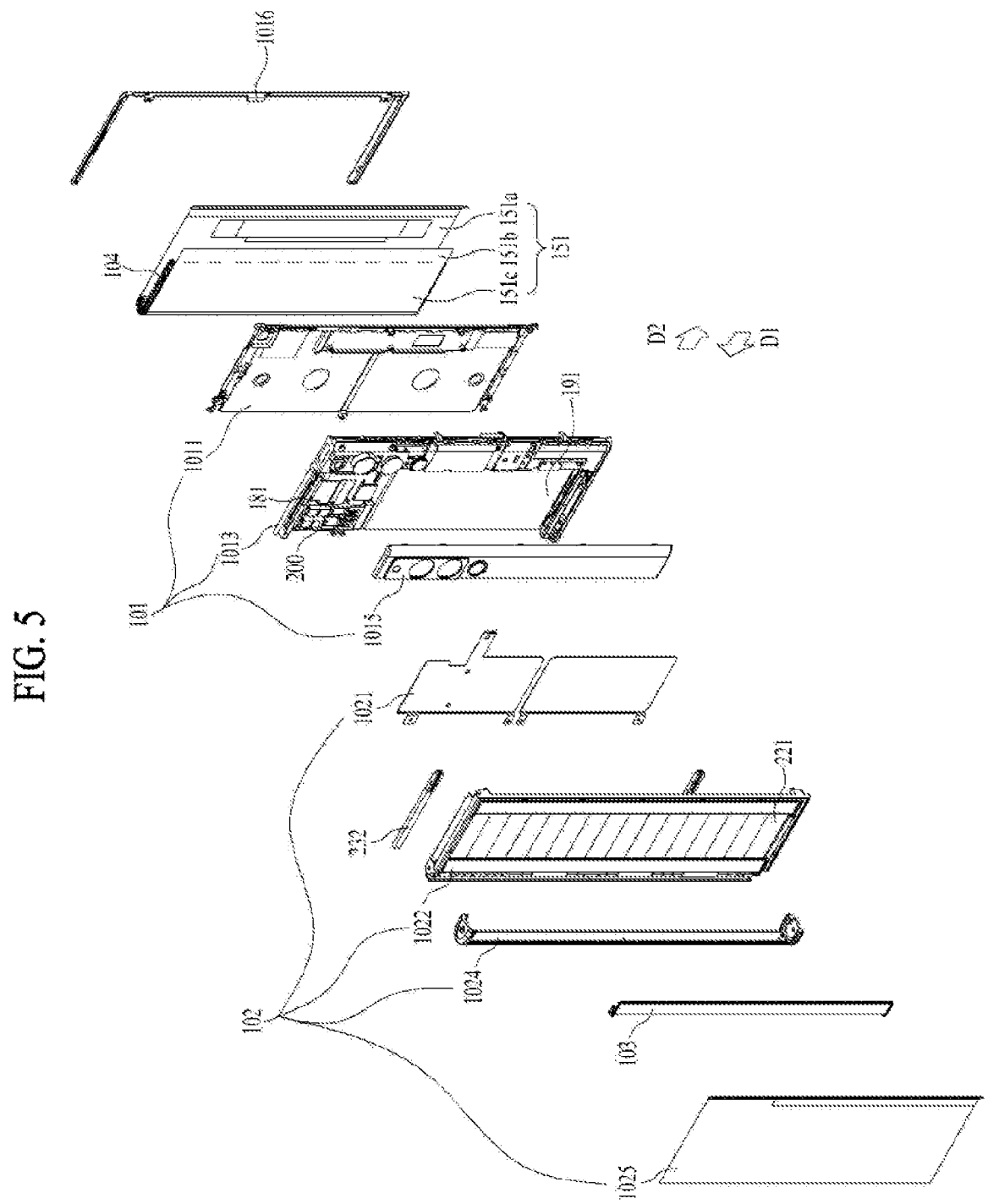

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151a and a second area 151b) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151a located at the front side of the mobile terminal 100 and the second area 151b coupled to the sliding frame 103 located at the rear side of the mobile terminal 100. The display 151 may also include a third area 151c located between the first area 151a and the second area 151b. The third area 151c may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction) and may be coupled to the second rear portion 1022 to be movable in the first direction D1 and the second direction D2.

The first area 151a, the second area 151b, and the third area 151c may be connected to one another and form a continuous body of the display 151. Also, as described above, to allow the third area 151c to move to the front side or the rear side of the mobile terminal 100 based on a moving direction of the second frame 102, the first area 151a may be unmovably fixed to the front side of the mobile terminal 100 and the second area 151b may be movably provided on the rear side of the mobile terminal 100. Such configuration of the display 151 will be described in detail below.

The first area 151a may be located at the front side of the mobile terminal 100, for example, the front side of the first front portion 1011 of the first frame 101. The first area 151a may be fixed to the front side of the first frame 101, for example, the front side of the first front portion 1011 so as not to move even when the second frame 102 moves.

Through this, the first area 151a may always be exposed at the front side of the mobile terminal 100.

The third area 151c may be adjacent to the first area 151a. The third area 151c may extend into the second frame 102 to be rolled on the roller 210. Continually, the third area 151c may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151c is also arranged at the rear side of the first frame 101.

The second area 151b may be adjacent to the third area 151c and located at the rear side of the mobile terminal 100, for example, the rear side of the second rear portion 1022 of the second frame 102. The second area 151b may be coupled to the sliding frame 103 instead of being coupled directly to the second frame 102.

As a result, the first area 151a may be located at the front side of the mobile terminal 100 to be always exposed at the front side irrespective of the movement of the second frame 102. Also, the second area 151b may be located at the rear side of the mobile terminal 100 to be always exposed at the rear side irrespective of the movement of the second frame 102. The third area 151c may be between the first and second areas 151a and 151b and selectively arranged at the front side or the rear side of the mobile terminal 100 based on the moving direction (e.g., D1, D2) of the second frame 102.

In such a selective arrangement of the third area 151c, since the third area 151c moves to the front side of the mobile terminal 100 and the second rear portion 1022 moves in the first direction D1 in the second state, a first rear portion 1012's portion which is covered by the second area 151b and the third area 151c of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151c of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151c may be rolled on the roller 210 in the second frame 102 to be curved. When the first state is changed to the second state, the third area 151c may extend from the second frame 102 to the front side of the mobile terminal 100 while being rolled on the roller 210 in one direction. When the second state is changed to the first state, the third area 151c may be rolled on the roller 210 in a reverse direction to retract from the front side of the mobile terminal 100 to the second frame 102. Simultaneously, the third area 151c may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151c located in the rear-side direction may move in the front-side direction. In this case, a structure for supporting the rear side of the third area 151c moved to the front side may be required. The second front portion 1021 located at the front side of the second frame 102 may be located at the rear side of the third area 151c in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151a and the third area 151c of the flexible display 151. A rolling plate 104 may be used as a support structure for filling a space between the second front portion 1021 and the third area 151c of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151c in which the rolling plate 104 is located may be a portion in which bending deformation occurs when the first state is changed to the second state. Thus, the rolling plate 104 may be deformed based on the deformation of the third area 151c. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
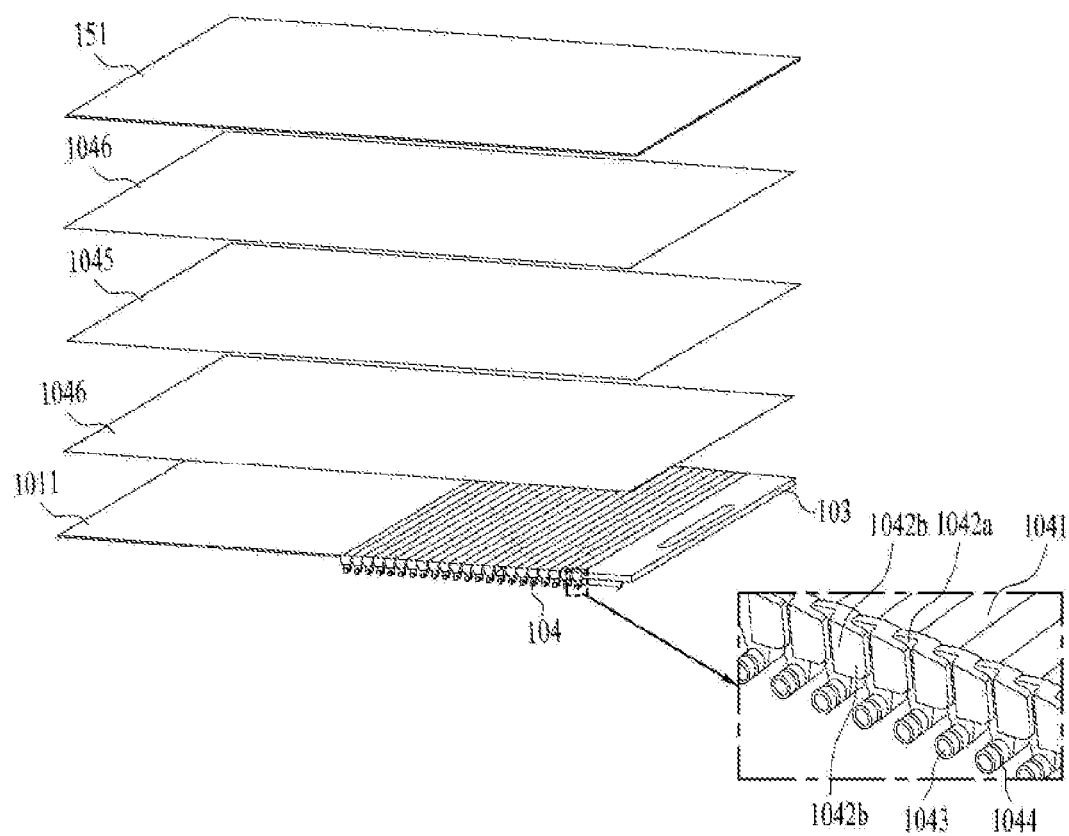
FIG. 9 illustrates a display part and a rolling plate of a mobile terminal according to an example embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151*c*, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151*a*, the sliding frame 103 located at the rear side of the second area 151*b*, and the rolling plate 104 located at the rear side of the third area 151*c* may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

Figure 10:
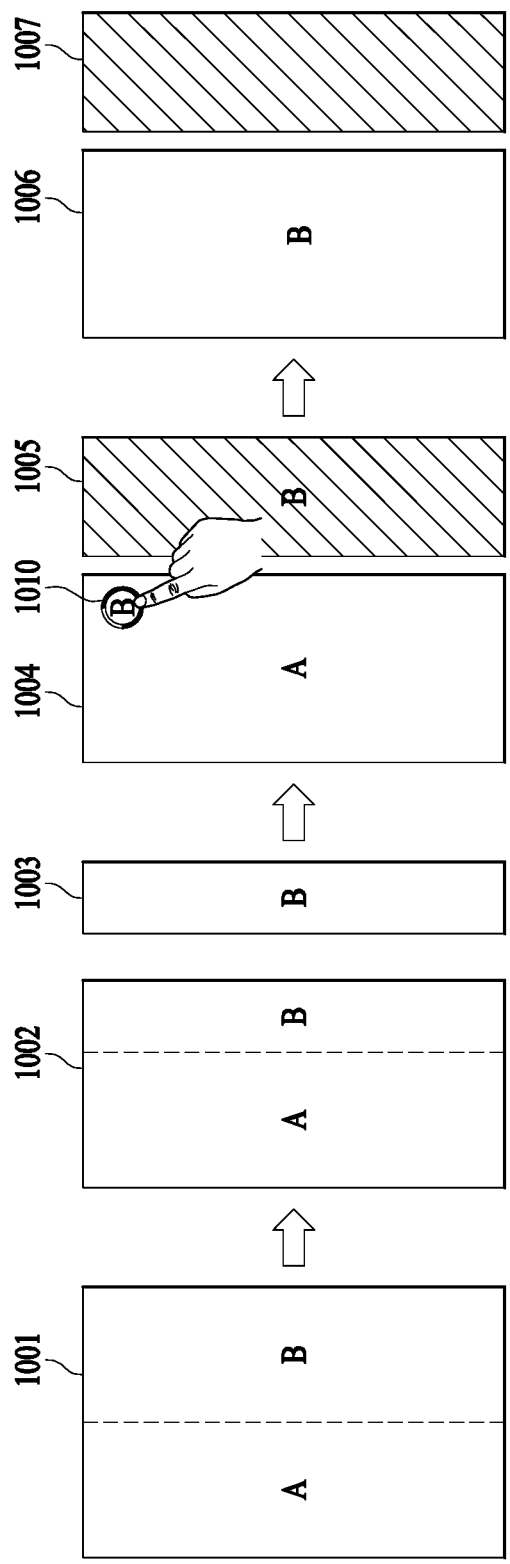
FIGS. 10 and 11 illustrate a mobile terminal according to an example embodiment of the present disclosure.
Figure 11:
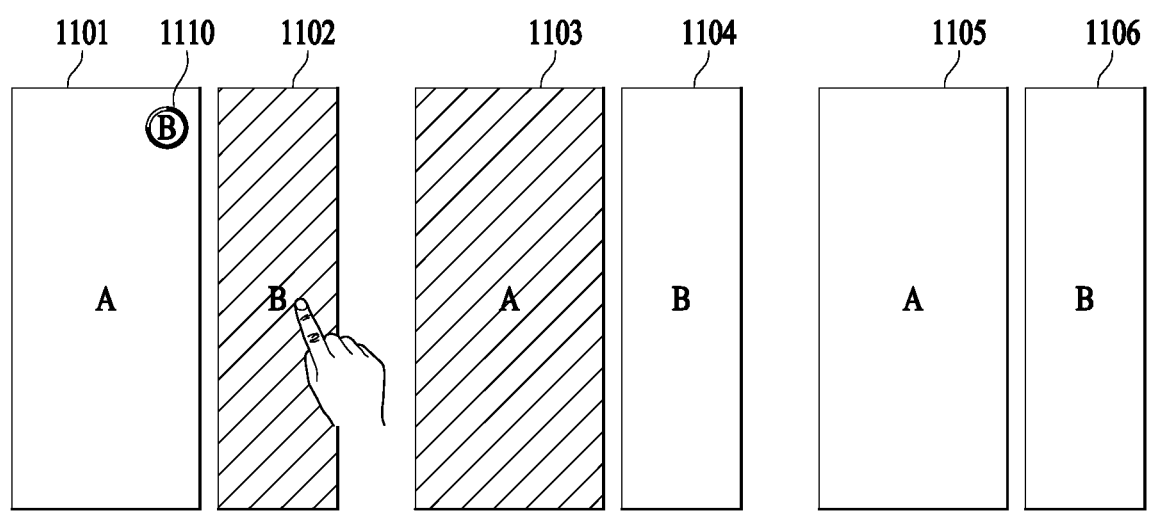

FIGS. 10 and 11 illustrate a mobile terminal according to an example embodiment of the present disclosure. Specifically, FIGS. 10 and 11 illustrate screens displayed on a mobile terminal in response to a received input and a size change of a display.

Referring to FIG. 10, a first screen 1001 may be displayed on a first side (e.g., a front side) of a mobile terminal. The first screen 1001 may include content A of a first application and content B of a second application provided based on executions of the first application and the second application. Also, the content A and the content B may include distinguishable contents provided in the same application. For example, when a video is provided in a specific application, the video may be included in an area A and addition information associated with the video may be displayed in an area B.

A size by which the display is located at the first side may be reduced. In response to the size reduction, a second screen 1002 may be displayed on the first side. In this case, at least a portion of the display may be located at a second side (e.g., a rear side) facing the first side.

In response to at least a portion of an area of the display located at the first side being relocated to another side, the mobile terminal may suspend displaying at least a portion of content corresponding to an area located at the other side. As an example, when a portion of an area of the display is positioned to the second side, the mobile terminal may suspend displaying the content B in the second screen 1002 and a third screen 1003. As another example, when an area including the content B corresponding to the third screen 1003 in the display is arranged on the second side, the mobile terminal may suspend displaying content displayed in the area on the second side, for example, the content B corresponding to the third screen 1003.

In response to at least a portion of an area of the display located at the first side being relocated to another side, the mobile terminal may display a separate layer to overlap at least a portion of content corresponding to the at least the portion of the area. For example, when a portion of the area of the display is located at the second side, the mobile terminal may display a separate layer to overlap the content B of the third screen 1003.

In some cases, the suspension of displaying the content corresponding to the portion located at the other side or the displaying of the separate layer may be performed after the size reduction of the display is completed. In such cases, since the second screen 1002 and the third screen 1003 are screens displayed during the size reduction of the display, the displaying of the content B may be maintained as illustrated. However, embodiments are not limited thereto. For example, the suspension of displaying the content on the area located at the second side or the displaying of the overlapping separate layer may be performed in real time. The separate layer may be a layer having a transparency, so that content below the layer is viewed through the layer.

Referring to FIG. 10, the area corresponding to the content B in the area of the display may be located at the second side so the size reduction of the display located at the first side is completed. In response to the completion, a fourth screen 1004 may be displayed on the first side and a fifth screen 1005 may be displayed on the second side. Here, the fifth screen 1005 may be a screen in which a separate layer is superimposed on the content B, but is not limited thereto. The fifth screen 1005 may include a screen in which displaying of the separate layer is omitted in accordance with the suspension of displaying the content B, a locked screen, or a screen for which touch input sensing is inactivated.

The mobile terminal may provide an icon 1010 indicating related content on the first side in response to a size change (or size reduction) of the display. For example, in a case in which the area corresponding to the content B is located on the second side and the separate layer is displayed to overlap the content B, or the displaying of the content B is suspended, the icon 1010 related to the content B may be displayed as shown in the fourth screen 1004. The icon 1010 may include an icon of an application that provides the content B, for example, an icon of the second application.

The suspension of displaying the content or the overlapping displaying of the separate layer may be maintained for a predetermined period of time. In this case, the mobile terminal may provide information on the predetermined period of time around the icon 1010 as shown in the fourth screen 1004. Specifically, the mobile terminal may provide the information on the predetermined period of time by displaying an image representing a lapse of the predetermined period of time on a perimeter of the icon 1010. However, it is merely provided as an example and the information on the predetermined period of time may be provided in various forms. Related examples will be described with reference to FIG. 22 or 23.

When a first input to the icon 1010 is applied within the predetermined period of time, the content B may be displayed in an area corresponding to the first input. Specifically, when the first input to the icon 1010 is applied within the predetermined period of time, the content B may be displayed in an area in which the icon 1010 is displayed on the first side, that is, an area in which the content A is displayed. For example, a sixth screen 1006 may be displayed on the first side. In response to the first input, a seventh screen 1007 may appear on the second side. The seventh screen 1007 may be a locked screen, an empty screen, or a screen for providing information based on an always on display (AOD).

The mobile terminal may be set to terminate an application related to content or drive the application in a background region when the predetermined period of time elapses without receiving an input. Referring to FIG. 10, for example, when the predetermined period of time elapses without receiving an input to the icon 1010, the mobile terminal may terminate the second application providing the content B. Through this, the displaying of the content B may be terminated.

As described with reference to FIG. 10, even if a portion of an area in which content is displayed moves to the rear side in response to a display size reduction while a user is using the content provided on the front side of the mobile terminal, it is possible to easily use the content used on a screen of the front side without making an additional motion of turning the mobile terminal or moving to a home screen to re-execute an application on the front side.

Although not shown, in some cases, the displaying of the icon 1010 may be omitted. In such cases, when a predetermined first input is applied instead of the input to the icon 1010, the content B may be displayed in an area corresponding to the first input. An example related to the predetermined first input will be described with reference to FIG. 14.

FIG. 11 illustrates a case in which an input (e.g., a second input) different from the input to the icon 1010 of FIG. 10 is received. A first screen 1101 of FIG. 11 may correspond to the fourth screen 1004 of FIG. 10. A second screen 1102 of FIG. 11 may correspond to the fifth screen 1005 of FIG. 10.

Referring to FIG. 11, a second input (e.g., a touch input to the second side) may be received in a state in which the first screen 1101 is displayed on a first side of a mobile terminal and the second screen 1102 is displayed on a second side. In this case, content B may be displayed in an area corresponding to the second input. For example, a fourth screen 1104 including the content B may be displayed on the second side. In response to the fourth screen 1104 being displayed, a third screen 1103 may be displayed on the first side.

As illustrated in FIG. 11, the third screen 1103 may include a screen in which a separate layer overlaps content A but is not limited thereto. In some cases, the third screen 1103 may include a screen in which the displaying of the content A and the separate layer is omitted, a locked screen, a screen for providing information based on an AOD, or a screen for which touch input sensing is inactivated. The fourth screen 1104 may include a screen on which the content B is displayed.

When the second input is received, a fifth screen 1105 may be displayed on the first side and a sixth screen 1106 may be displayed on the second side. For example, the content B may be displayed on the second side in a state in which the displaying of the content A is maintained on a screen of the first side.

The first input of FIG. 10 and the second input of FIG. 11 are not limited to the foregoing examples and may include predetermined inputs distinguished from each other. As an example, the first input may include a swipe input of a first direction and the second input may include a swipe input of a second direction. As another example, the first input may include a touch input to a first position and the second input may include a touch input to a second position. As another example, the first input may include a left-direction swipe input applied to the icon 1010 and the second input may include a right-direction swipe input applied to the icon 1010.

Figure 12:
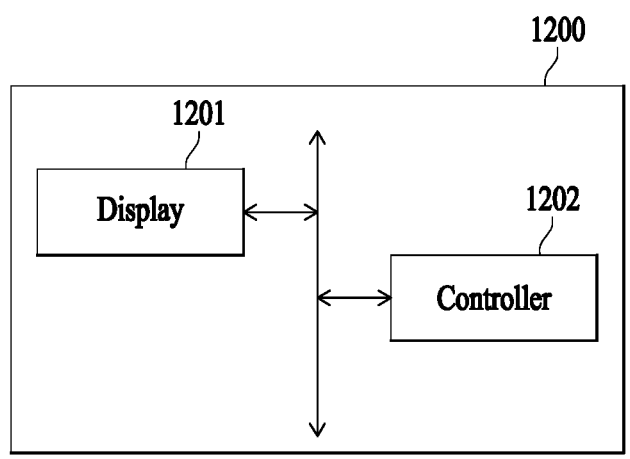
FIG. 12 is a functional block diagram illustrating a mobile terminal according to an example embodiment of the present disclosure.

FIG. 12 is a functional block diagram illustrating a mobile terminal according to an example embodiment of the present disclosure. As described below, an element of a mobile terminal 1200 may be a unit that processes at least one function or operation and may be implemented through hardware, software, or a combination of hardware and software.

Referring to FIG. 12, the mobile terminal 1200 may include a display 1201 and a controller (or processor) 1202.

The display 1201 may be located to be changed in size by which the display 1201 is exposed at a first side of the mobile terminal 1200 (e.g., a front side of the mobile terminal 1200). The size by which the display 1201 is exposed at the first side may be changed based on a control of the controller 1202 described below.

A portion of the display 1201 may be located at the first side of the mobile terminal 1200 and another portion may be located at another side of the mobile terminal 1200 (e.g., a rear side or a side surface of the mobile terminal 1200). As an example, a second area of the display 1201 may be located at the first side of the mobile terminal 1200 and a first area of the display 1201 may be located at the second side facing the first side. As another example, the second area of the display 1201 may be located at the first side of the mobile terminal 1200, and at least a portion of the first area of the display 1201 may be arranged on a third side that is located between the first side and the second side and wound on one side of the mobile terminal 1200.

A portion of the display 1201 may be located at the first side, and another portion may be wound on one side of the mobile terminal 1200 and located at the second side of the mobile terminal 1200. Specifically, the display 1201 may be bent at one end adjoining with the first side, have at least a portion located at the first side, and have at least another portion located at the second side adjoining with the one end. However, embodiments are not limited thereto. The display 1201 may be divided into a plurality of areas connected using hinges. The display 1201 may be arranged such that one area of the plurality of areas is fixedly located at the first side and another area is located at the first side or the second side based on hinge driving.

A variety of information associated with an operation of the mobile terminal 1200 may be displayed on the display 1201. For example, an icon of an application or content of the application provided based on an execution of the application may be displayed on the display 1201. Here, the icon of the application may include an icon to which an input is applied for execution of the application. Also, the content of the application may include various contents related to a function of the application provided when the application is executed.

The controller 1202 may control the mobile terminal 1200 or an element of the mobile terminal 1200. For example, the controller 1202 may execute application programs or instructions stored in a memory, thereby controlling an operation of the display 1201.

The controller 1202 may display the content of the first application in the first area of the display 1201 located at the first side based on the execution of the first application. The first area may include at least a portion of the display 1201 located at the first side. The content of the first application is content provided by the first application. For example, when the first application is a photo album application, content provided by the first application may be an image representing pictures.

The controller 1202 may execute a plurality of applications. In this case, the controller 1202 may display content of each of the applications. For example, based on execution of the first application and the second application, the controller 1202 may display the content of the first application in the first area of the first side of the display 1201 and display content of the second application in the second area of the first side.

The controller 1202 may arrange at least a portion of the first area of the display 1201 on another side. For example, the controller 1202 may move at least a portion of the first area of the display 1201 to another side (e.g., the second side facing the first side or a third side located between the first side and the second side and wound at one side of the mobile terminal 1200) in response to a size reduction of the display 1201 located at the first side. Through this, at least a portion of the first area may be located at the other side.

The controller 1202 may suspend displaying at least a portion of the content included in the first area in response to the at least the portion of the first area being arranged on the other side. As an example, the controller 1202 may suspend displaying the content in the first area when the first area is relocated from the first side to the second side due to the size reduction of the display 1201 located at the first side. As another example, when the first area is relocated from the first side to the second side due to the size reduction of the display 1201 located at the first side, the controller 1202 may suspend displaying the content in the first area and then switch the first area to a locked screen or display an AOD screen.

The controller 1202 may display a separate layer to overlap at least a portion of the content in response to at least a portion of the first area being located at the other side. Specifically, when at least a portion of the first area of the display 1201 located at the first side is located to another side, the controller 1202 may display a separate layer to overlap at least a portion of the content displayed in the first area. For example, the controller 1202 may display the separate layer to fully overlap the content displayed in the first area in response to the first area being located at the second side due to the size reduction of the display 1201 on the first side. Here, the separate layer may include an image having a predetermined transparency value but is not limited thereto, and may be implemented in various ways.

In response to at least a portion of the first area being located at the other side, the controller 1202 may deactivate touch input sensing for an area located at the other side. For example, when at least a portion of the first area is located at the second side, the controller 1202 may deactivate touch input sensing of the second side (or the first area located at the second side).

The controller 1202 may display an icon related to the first application on the display located at the first side in response to the first area being located the other side. For example, when the display 1201 of the first side includes the first area and the second area, and when the first area is located at the second side in response to the size reduction of the display 1201, the controller 1202 may display the icon related to the first application in the second area. Here, the first application may be an application that provides content displayed in the first area as described above and the icon related to the first application may include an icon indicating the first application.

The controller 1202 may display the icon related to the first application based on a position of the first area. When the display 1201 of the first side includes the first area and the second area, the controller 1202 may display the icon related to the first application in a portion of an area of the second area in response to the first area moving to the second side. The area of the second area may be close to an area in which the first area is previously positioned. For example, the first area may be located in a right portion of the first side and the second area may be located in a left portion of the first area to be in contact with the first area. In this example, when the first area is moved to the second side, the controller 1202 may display the icon related to the first application in a right portion of the second area in contact with the first area.

The controller 1202 may display the icon related to the first application in response to the first area being moved. When the first area of the first side is moved to the second side, the controller 1202 may display the icon related to the first application in an area corresponding to a moving direction of the first area in the second area of the first side. For example, when the first area is wound on a right side of the mobile terminal 1200 and located at the second side, the controller 1202 may display the icon related to the first application in a right portion of the second area.

In some cases, content of the second application may be displayed in the second area in which the icon is displayed. Here, the content of the second application may include content displayed on the first side along with the content of the first application but is not limited thereto. When the content of the second application is displayed in the second area, the icon related to the first application may be displayed to overlap the content of the second application.

The controller 1202 may display the icon related to the first application at a predetermined position on the display 1201 of the first side. For example, the controller 1202 may display the icon related to the first application at a first position in an upper portion of the first side.

When at least a portion of the first area is located at another side, the controller 1202 may suspend displaying at least a portion of content for a predetermined period of time or display a separate layer to overlap at least a portion of the content for the predetermined period of time. In this case, the icon related to the first application may be displayed for the predetermined period of time. After the predetermined period of time elapses, the controller 1202 may terminate the first application providing the content.

When at least a portion of the first area is located at another side, the controller 1202 may control a brightness of at least a portion of the first area located at the other side to a predetermined value. For example, in response to at least a portion of the first area being located at another side, first content (or at least a portion of the first content) may be displayed in an area located at the other side. In this example, the controller 1202 may control a brightness of the area in which the first content is displayed on the other side, to the predetermined value. The predetermined value may be a value previously determined for providing a relatively dark screen.

In some cases, when at least a portion of the first area is located at another side, the controller 1202 may display a separate layer to overlap the first content or control the brightness of the first area in which the first content is displayed to the predetermined value.

The predetermined period of time may be determined based on a type of the content of the first application displayed in the first area. For example, when a type of the content is image or video content, the predetermined period of time may be determined to be a first time. Also, when a type of the content is a text, the predetermined period of time may be determined to be a second time. Here, the first time may be a time longer than the second time but is not limited thereto.

The controller 1202 may display at least one of at least a portion of content, information on the content, and information on the predetermined period of time on the display 1201 located at the first side. Specifically, the controller 1202 may further display at least one of the at least the portion of content, the information on the content, and the information on the predetermined period of time in response to an icon indicating the first application being displayed.

In such cases, at least a portion of the content may be displayed in a size less than an original size and displayed when a type of the content is related to an image or video. An example related to at least a portion of content will be described in detail with reference to FIG. 20. The information on the content may include, for example, information on a type, a name, and a size of the content or a name of the first application. The information on the predetermined period of time may include, for example, information on an amount of time that elapses from a point in time at which the first area is located at the other side, the predetermined period of time, or a remaining time calculated based on a difference between the predetermined period of time and the amount of time. An example of information on a predetermined period of time will be described in detail with reference to FIG. 22 or 23.

When an input related to the first application is received, the controller 1202 may display the content of the first application in an area corresponding to the input. Specifically, when the first input is received, the controller 1202 may display the content of the first application in an area corresponding to the first input. Also, when the second input is received, the controller 1202 may display the content of the first application in an area corresponding to the second input.

As an example, in response to the first input, the controller 1202 may display the content of the first application in the second area on the first side. The first input may include, for example, an input applied to the icon related to the first application displayed in the second area within a predetermined period of time or a swipe input applied in a first direction to at least a portion of the first side within the predetermined period of time. In some cases, before the first input is received, the content of the second application may be displayed in the second area. In such cases, in response to the first input being received, the content of the second application may be replaced with the content of the first application. Here, the first input may be an applied input.

As another example, in response to the second input, the controller 1202 may display the content of the first application in the first area located at the second side (or the display located at the second side). The second input may include, for example, an input applied to the first area on the second side within a predetermined period of time or a swipe input applied in a second direction to at least a portion of the first side within the predetermined period of time.

In this example, the controller 1202 may deactivate touch input sensing for the display 1201 located at the first side or switch a screen of the display 1201 on the first side to a locked state. When the second input is received, the controller 1202 may display the content of the first application in the first area located at the second side, and deactivate the touch input sensing for the display 1201 located at the first side or switch the screen of the display 1201 on the first side to the locked state.

As still another example, the controller 1202 may display the content of the first application in at least a portion of the first area in response to an expansion input for the display 1201 being applied within a predetermined period of time. Specifically, when the controller 1202 identifies the expansion input for the display 1201 applied within the predetermined period of time, the controller 1202 may relocate at least a portion of the first area from another side to the first side and display the content of the first application in the at least the portion of the first area located at the first side.

The controller 1202 may verify whether the at least the portion of the first area located at the other side is relocated to the first side within a predetermined period of time. When the at least the portion of the first area located at the other side is relocated to the first side within the predetermined period of time, the controller 1202 may display the content of the first application in the at least the portion of the first area located at the first side.

In some cases, the at least the portion of the first area located at the other side may be relocated to the first side after the predetermined period of time elapses. In such cases, the controller 1202 may display, in the first area, the content that is displayed on the first side (or in the second area of the first side). The content displayed in the first area may include content different from the previously displayed content of the first application. For example, when the at least the portion of the first area located at the other side is relocated to the first side after the predetermined period of time elapses, the content displayed in the second area may be extended so as to be also displayed in the first area located at the first side. However, embodiments are not limited to the example. Another content may be displayed in the first area relocated to the first side.

The controller 1202 may determine an area corresponding to an input related to the first application based on a position at which the first input is received. For example, when an input is received at the first position, the controller 1202 may determine a predetermined area including the first position to be an area corresponding to the input. A related example will be further described with reference to FIG. 16.

Figure 13:
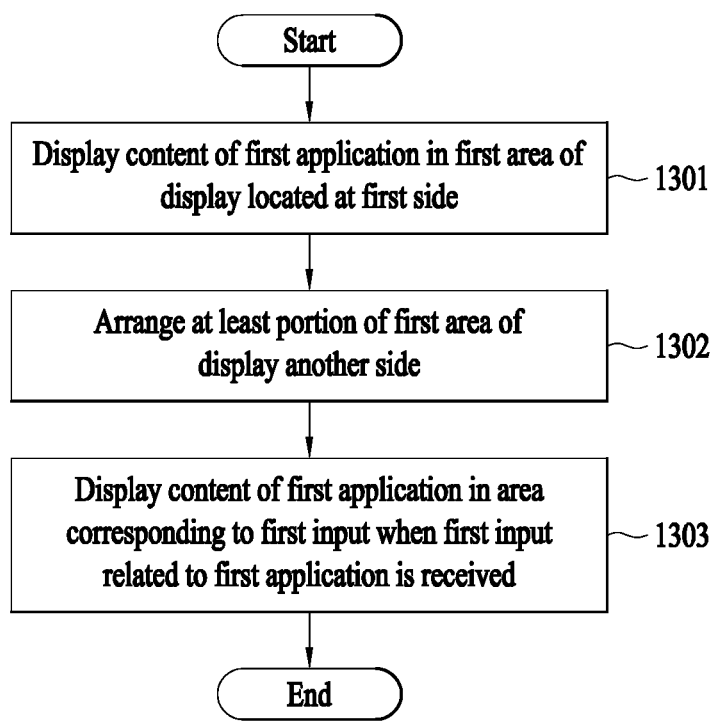
FIG. 13 is a flowchart illustrating a method of controlling a mobile terminal according to an example embodiment of the present disclosure.

FIG. 13 is a flowchart illustrating operations of a method of controlling a mobile terminal according to an example embodiment of the present disclosure. Operations illustrated in FIG. 13 may be performed in different orders or irrespective of an order depending on cases. Hereinafter, redundant description which has been made above will be omitted.

Referring to FIG. 13, in operation 1301, a mobile terminal may display content of a first application in a first area of a display located at a first side. Specifically, the mobile terminal may display the content of the first application in the first area of the display located at the first side based on an execution of the first application. In some cases, based on the execution of the first application and the second application, the mobile terminal may display the first application in the first area of the display located at the first side and display a second application in a second area of the display.

In operation 1302, the mobile terminal may arrange at least a portion of the first area of the display on another side. Specifically, the mobile terminal may arrange at least a portion of the first area of the display on another side based on an operation of reducing a size of the display located at the first side. Here, the first area of the display may include an area neighboring one side of the mobile terminal, the one side being an axis (or origination) of expansion or retraction of the display. In response to the size reduction of the display, at least a portion of the first area may be located to another side. For example, in response to the size reduction of the display, the display may be wound on a third side of the mobile terminal and then located to the second side. In this example, the first area may include an area more adjacent to the third side when compared to the second area.

When at least a portion of the first area of the display is located at the other side, the mobile terminal may suspend displaying content corresponding to the first area for a predetermined period of time or display a separate layer to overlap the content corresponding to the first area. The separate layer may include, for example, another content displayed to overlap the content with a predetermined transparency to indicate that displaying of the content is suspended or another content displayed in response to an inactivation of the first area. The predetermined period of time may be differently set based on a type of content displayed in the first area or a corresponding application. For example, when the content displayed in the first area is video content, the predetermined period of time may be about 15 seconds. Also, when the content displayed in the first area is text content, the predetermined period of time may be about ten seconds.

In response to the at least the portion of the first area being located at the other side, the mobile terminal may display an icon related to the first application on the display of the first side. When the second area is located at the display of the first side in response to response to the at least the portion of the first area being located at the other side, the mobile terminal may display the icon related to the first application in the second area.

In operation 1303, when the first input related to the first application is received, the mobile terminal may display the content of the first application in an area corresponding to the first input. As an example, when the first input related to the first application is received, the mobile terminal may display the content of the first application in at least a portion of the second area. As another example, when the mobile terminal receives the first input within a predetermined period of time from a point in time at which calculation is started based on at least a portion of the first area being located at another side (or content displaying being suspended or the separate layer being displayed to overlap the content), the mobile terminal may display the content of the first application in the area corresponding to the first input.

Here, the point in time for starting calculation of the predetermined period of time may be determined in advance.

An icon related to the first application may be displayed for a predetermined period of time. When a touch input to the icon is received within the predetermined period of time, the mobile terminal may display the content of the first application in the second area located at the first side. When the input to the icon is not received within the predetermined period of time, the mobile terminal may terminate the first application. An example of the touch input to the icon will be described with reference to FIG. 16.

The mobile terminal may receive an input applied to a predetermined position of the first side within a predetermined period of time. In this case, the mobile terminal may display the content of the first application in the second area located at the first side. When the input applied to the predetermined position is not received within the predetermined period of time, the mobile terminal may terminate the first application. An example of the input applied to the predetermined position will be described with reference to FIG. 14.

Figure 14:
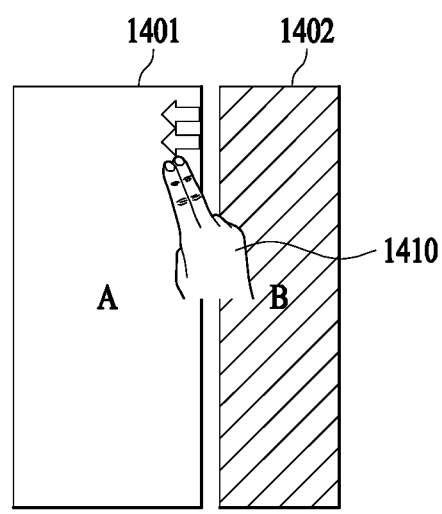
FIG. 14 illustrates an example of an input to a mobile terminal according to an example embodiment of the present disclosure.

FIG. 14 illustrates an example of an input to a mobile terminal according to an example embodiment of the present disclosure.

Referring to FIG. 14, a first screen 1401 may be displayed on a display located at a first side of a mobile terminal. Also, a second screen 1402 may be displayed on the display located at a second side. Specifically, based on at least a portion of a first area being located at the second side, the first screen 1401 may be displayed on the first side and the second screen 1402 may be displayed in the first area located at the second side.

In this case, a separate layer may be displayed to overlap content previously displayed in the first area. However, embodiments are not limited thereto. In some cases, content displaying may be suspended or an input to the second side may be restricted.

The separate layer may be continually displayed for a predetermined period of time. Whether to display the content again or terminate an application providing the content may be determined based on an input applied within the predetermined period of time. When a touch input 1410 to a predetermined position on the first side is received within the predetermined period of time as illustrated in FIG. 14, the content may be displayed again. The content may be displayed in an area corresponding to the input. As an example, content B associated with a second application may be displayed in an area on the first side, for example, the first screen 1401 on which content A associated with the second application is displayed. An example of displaying the content B will be further described with reference to FIG. 15.

Although FIG. 14 illustrates that the touch input 1410 is a swipe input sliding in a first direction as an example, the present example is not to be taken as being limited thereto. The touch input 1410 may be implemented as various types of input, for example, an input including at least one of a touch input to a predetermined position, a long-press input, and a knock-on input.

Predetermined content, for example, a text may be displayed on the separate layer displayed on the second screen 1402. The text may include, for example, a text indicating a locked screen or a text indicating information for releasing the locked screen. For example, the text may include a text "back screen is locked" or a text "slide screen to the right to use back screen."

When a predetermined input is applied to the second screen 1402, the mobile terminal may provide the content B on the second screen, terminate displaying the separate layer, or unlock the second screen. The predetermined input may be an input designated in advance and may include, for example, a swipe input in a predetermined direction.

Figure 15:
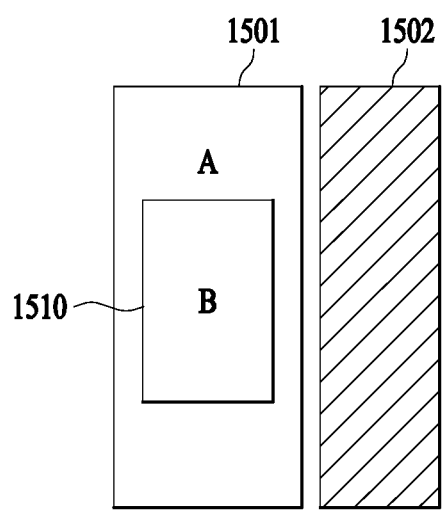
FIG. 15 illustrates an example of a screen displayed on a mobile terminal according to an example embodiment of the present disclosure.

FIG. 15 illustrates an example of a screen displayed on a mobile terminal according to an example embodiment of the present disclosure. Specifically, FIG. 15 illustrates a case in which content having been provided in a first area is displayed on a screen located at a first side in response to an input being received within a predetermined period of time after at least a portion of the first area is located at the second side.

Referring to FIG. 15, when an input is received within a predetermined period of time after at least a portion of the first area is located at the second side, a first screen 1501 may be displayed on a display of the first side and a second screen 1502 may be displayed on a display of the second side. Specifically, in response to a first input (e.g., an input to a predetermined position on the first side and a touch input to an icon displayed on the first side) being received within the predetermined period of time, content B 1510 of a first application may be displayed on the first screen 1501 located at the first side.

As illustrated, content A of a second application may be displayed on the first side. In this case, in response to the first input, the content B may be displayed to overlap the content A as shown in the first screen 1501. Here, the content B may correspond to content of the first application displayed in the first area before at least a portion of the first area is located at the second side but is not limited thereto. Instead, at least a portion of the content of the first application or another content of the first application may be displayed.

Although not shown, in some cases, the content B may be displayed on the entire of the first screen 1501 to replace the content A in response to the input.

The second screen 1502 may correspond to an empty screen on which provision of content is suspended. However, it is merely an example and the second screen 1502 may include, for example, a locked screen or an always-on-display (AOD) screen. Although not shown, when the second screen 1502 includes an AOD screen, predetermined information, for example, time or alarm information may be displayed on the second screen 1502.

Figure 16:
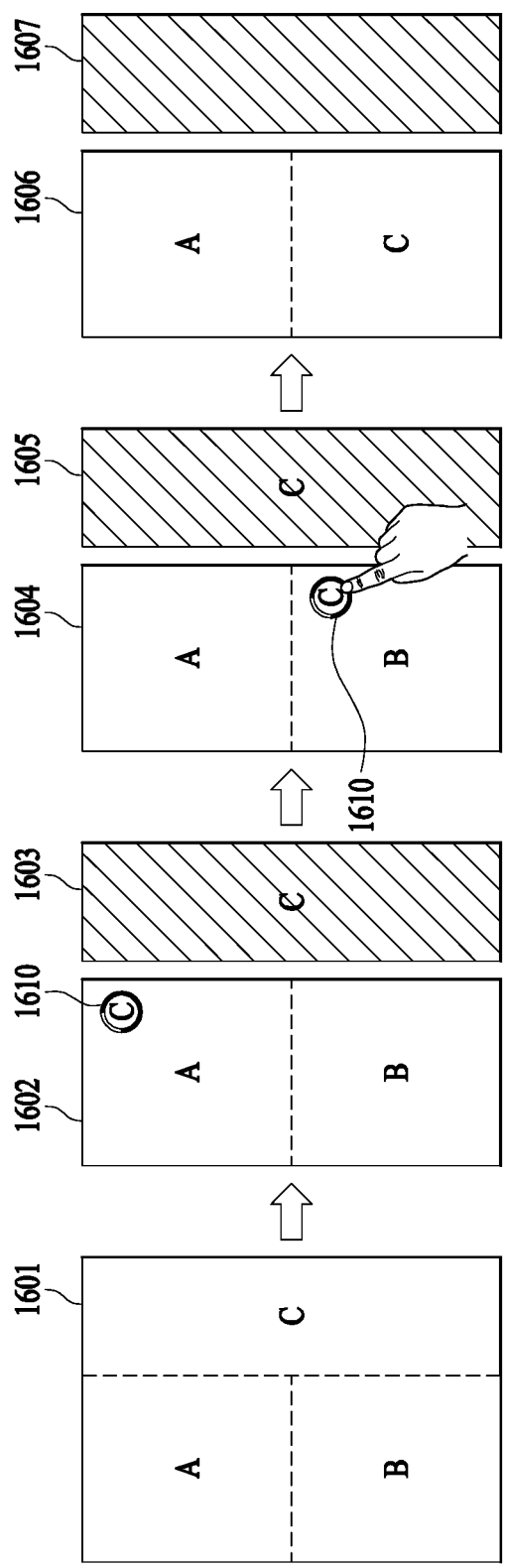
FIG. 16 illustrates an example of content displayed on a mobile terminal according to an example embodiment of the present disclosure.

FIG. 16 illustrates an example of displaying content on a mobile terminal according to an example embodiment of the present disclosure. Specifically, FIG. 16 illustrates a mobile terminal in a case in which three contents are displayed based on an execution of three applications.

Referring to FIG. 16, based on three applications being executed, a first screen 1601 including content A associated with a first application, content B associated with a second application, and content C associated with a third application may be displayed on a display of a first side. As illustrated in FIG. 16, the content C may be displayed in a first area, and the content A and the content B may be respectively displayed in an upper portion and a lower portion of a second area.

In response to a size reduction of the display, at least a portion of the first area may move from the first side to be located at another side of the mobile terminal. In this case, a second screen 1602 may be displayed on the first side of the display and a third screen 1603 may be displayed on the other side. For example, when the first area is located at the second side in response to the size reduction of the display, the second screen 1602 including the content A and the content B may be displayed on the first side and the third screen 1603 in which displaying of the content C is suspended or a separate layer overlaps the content C may be displayed on the other side. Here, the other side may include the second side but is not limited thereto. The other side may also include a third side located between the first side and the second side.

As shown in the second screen 1602 of FIG. 16, in response to at least a portion of the first area being located at the other side, an icon 1610 related to an application corresponding to the first area may be displayed on the first side. For example, the icon 1610 may include an icon indicating an application providing content displayed in at least a portion of the first area located at the other side.

The icon 1610 may be displayed fora predetermined period of time. Here, the predetermined period of time may be a predetermined period of time (e.g., ten seconds) and calculated from a point in time at which at least a portion of the first area is located at the other side. However, the point in time for starting calculation of the predetermined period of time is not limited thereto. For example, the predetermined period of time may be calculated from a point in time at which content displaying is suspended or a point in time at which a separate layer is superimposed on content.

The icon 1610 may further include information on the predetermined period of time in addition to the icon indicating the application. For example, as illustrated, an image representing a percentage of elapsed time in the predetermined period of time may be displayed on a perimeter of the icon. However, it is merely an example and the information on the predetermined period of time may be displayed along with the icon in various ways. A related example will be described in detail with reference to FIG. 22 or 23.

The icon 1610 may be implemented as a floating icon to move based on an input of a user. Specifically, the icon 1610 may be moved in response to a drag input to the icon 1610. For example, as shown in a fourth screen 1604, the icon 1610 displayed to overlap a portion of the content A in the second screen 1602 may be moved to an area in which the content B is displayed. In this example, a fifth screen 1605 may be displayed on the second side. The fifth screen 1605 may correspond to the third screen 1603.

When an input to the icon 1610 is applied within a predetermined period of time, the mobile terminal may display content corresponding to the icon 1610 in an area corresponding to the input. For example, when the icon 1610 is related to the third application providing the content C in the first area located at the second side, the mobile terminal may display the content C in response to an input to the icon 1610 being received.

When a screen displayed on the first side includes a plurality of contents as shown in the fourth screen 1604, a position for displaying the content C may be determined based on an input (or a position of the icon 1610). As an example, when an input for the icon 1610 is applied to one area overlapping the content B based on the icon 1610 displayed to overlap the content B as shown in the fourth screen 1604, the content C corresponding to the icon 1610 may be displayed in at least a portion of an area in which the content B is displayed as shown in a sixth screen 1606.

As another example, when a first input is applied based on the icon 1610 displayed to overlap the content B as shown in the fourth screen 1604, the content C corresponding to the icon 1610 may be displayed in at least a portion of the area in which the content B is displayed as shown in the sixth screen 1606. In this example, the second application providing the content B may be terminated. Here, the first input may include an input applied to the icon 1610 but not is limited thereto. For example, the first input may include an input to a predetermined position on the first side or a predetermined type of input (e.g., a swipe input).

When the sixth screen 1606 is displayed through the display of the first side, a seventh screen 1607 may be displayed on the display of the second side. When the third screen 1603 or the fifth screen 1605 is a screen in which a separate layer overlaps the content C, the seventh screen 1607 may be a screen in which displaying of the content C and the separate layer is terminated.

Figure 17:
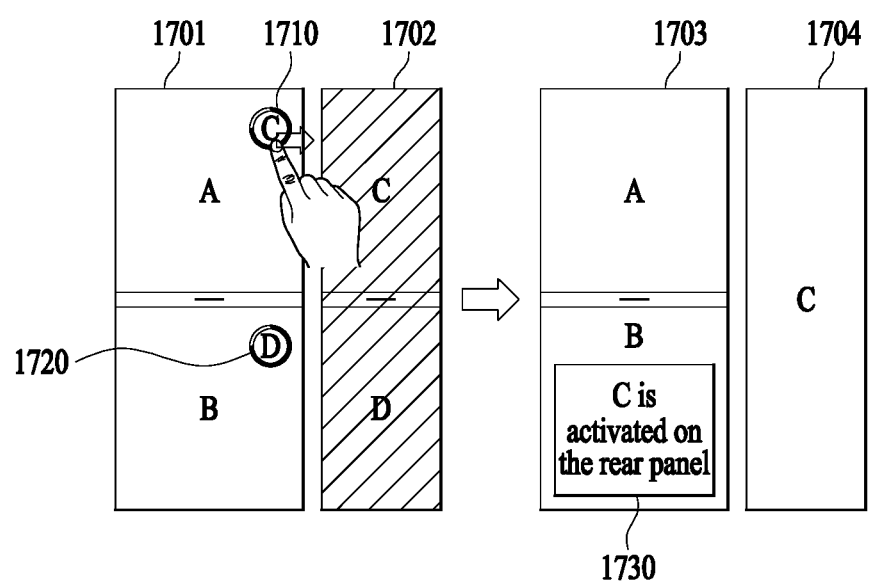
FIG. 17 illustrates another example of content displayed on a mobile terminal according to an example embodiment of the present disclosure.

FIG. 17 illustrates another example of displaying content on a mobile terminal according to an example embodiment of the present disclosure. Specifically, FIG. 17 illustrates a case in which an area located at a second side includes a plurality of contents to correspond to a size reduction of a display or an input for displaying content is received on the second side.

Referring to FIG. 17, contents (content A, content B, content C, and content D) of different applications may be displayed on a display of a first side. In this instance, in response to a size reduction of the display, a first screen 1701 may be displayed on the display located at the first side and a second screen 1702 may be displayed on the display located at a second side. As illustrated, the first screen 1701 may include the content A of a first application and the content B of a second application. Also, the second screen 1702 may include the content C of a third application and the content D of a fourth application. In the second screen 1702, a separate layer may be displayed to overlap the content C and the content D.

The mobile terminal may display an icon of an application related to an area located at the second side as shown in the first screen 1701 in response to the size reduction of the display. When a plurality of applications are related to the area located at the second side, icons (e.g., a first icon 1710 and a second icon 1720) respectively indicating the applications may be displayed as illustrated in FIG. 17.

When the plurality of applications is related to the area located at the second side, the icons may be displayed based on positions of contents related to the applications. For example, when the content C and the content D are vertically arranged in the area located at the second side, the first icon 1710 corresponding to the content C and the second icon 1720 corresponding to the content D may also be arranged vertically.

The mobile terminal may display contents corresponding to the icons (e.g., the first icon 1710 and the second icon 1720) based on inputs applied to the icons. Specifically, the mobile terminal may receive the inputs applied to the icons within a predetermined period of time and display the contents based on the received inputs and the icons to which the inputs are applied. For example, as illustrated, when a right-direction swipe input applied to the first icon 1710 is received, the content C corresponding to the first icon 1710 may be displayed on the second side. Through this, a fourth screen 1704 may be displayed on the second side and a third screen 1703 may be displayed on the first side. Here, the right-direction swipe input may be an input for displaying content on the second side and correspond to the second input described with reference to FIG. 12.

Although not shown, when a left-direction swipe input to the first icon 1710 is received, the content C corresponding to the first icon 1710 may be displayed in at least a portion (e.g., an area corresponding to the content A) of the first side. In this case, the application providing the content D may be terminated and a screen of the second side may be changed to a locked screen, an empty screen, or an AOD screen. Here, the left-direction swipe input may be an input for displaying content on the first side and correspond to the first input described with reference to FIG. 12.

The third screen 1703 may include a screen in which displaying of the first icon 1710 and the second icon 1720 is terminated based on an input to the first icon 1710. For example, the third screen 1703 may include, but not be limited to, content 1730 indicating a state of the second side as illustrated. The third screen 1703 may include other contents or may not display the content 1730.

On the fourth screen 1704, the content C corresponding to the first icon 1710 may be displayed based on the input to the first icon 1710. The fourth screen 1704 may include a screen in which displaying of the content D corresponding to the second icon 1720 is terminated. In this case, the application providing the content D may be terminated.

When the predetermined period of time elapses without receiving the input to the first icon 1710 or the second icon 1720, displaying of the first icon 1710 and the second icon 1720, the application corresponding to the first icon 1710, and the application corresponding to the second icon 1720 may be terminated. In this case, the display of the second side may display an empty screen or an AOD-state screen.

Referring to FIG. 17, when a plurality of contents is displayed vertically, a button for discriminating the contents and adjusting a size of each of the contents may be displayed. The button may be vertically moved such that the vertically arranged contents, for example, the content A and the content B, and the content C, and the content D, are adjusted in size in response to the movement of the button.

Figure 18:
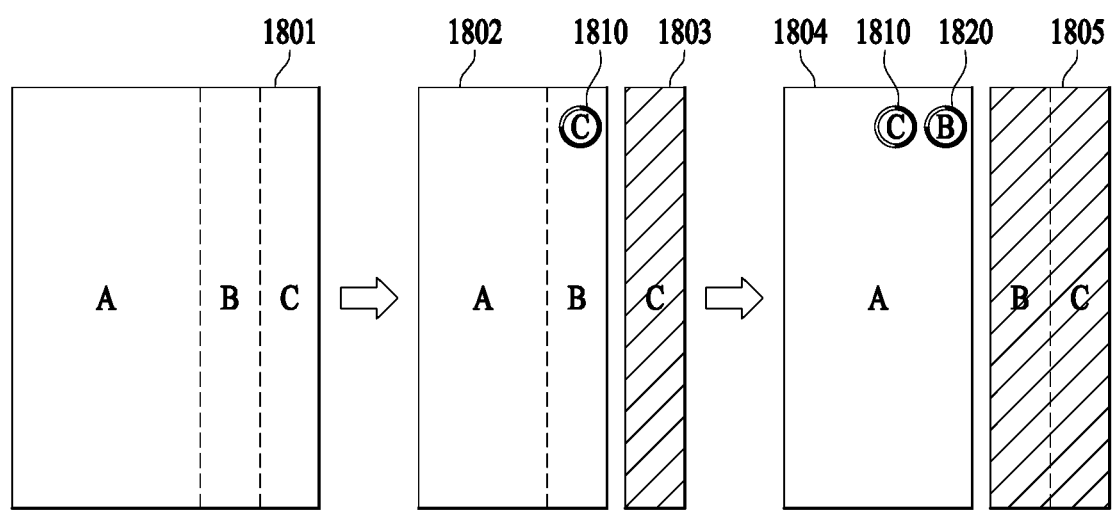
FIGS. 18 and 19 illustrate examples of icons displayed on a mobile terminal according to an example embodiment of the present disclosure.
Figure 19:
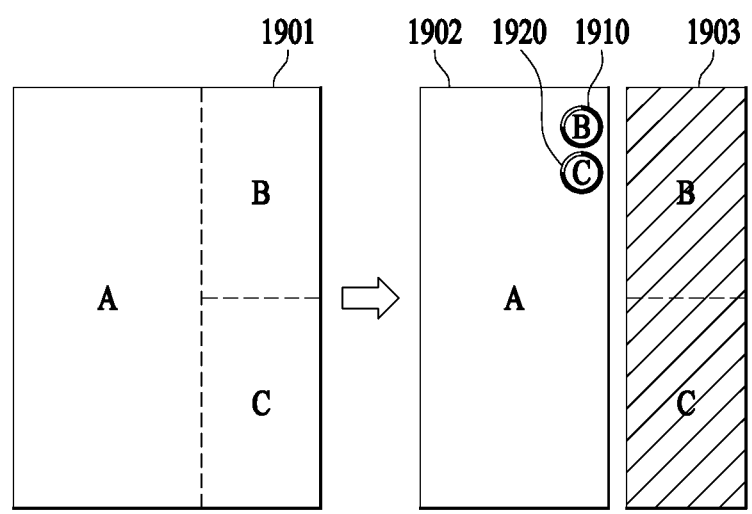

FIGS. 18 and 19 illustrate examples of displaying an icon on a mobile terminal according to an example embodiment of the present disclosure. Specifically, FIG. 18 illustrates an example of displaying an icon in a case in which different contents are displayed horizontally in an area located at a second side and FIG. 19 illustrates an example of displaying an icon in a case in which different contents are displayed vertically in the area located at the second side.

Referring to FIG. 18, in a display-extended state, a first screen 1801 in which content A, content B, and content C are arranged in parallel may be displayed on a first side. In response to a size reduction of a display, an area in which the content C is displayed and an area in which the content B is displayed may sequentially move to a second side and arranged on the second side. In this case, an icon corresponding to the content C and an icon corresponding to the content B may be sequentially displayed.

Specifically, in response to the area in which the content C is displayed being located at the second side, a second screen 1802 may be displayed on the first side and a third screen 1803 may be displayed on the second side. The second screen 1802 may include a first icon 1810 for the content C. The first icon 1810 may be displayed in response to the area in which the content C is displayed being located at the second side. The third screen 1803 may include a screen in which a separate layer overlaps the content C but is not limited thereto. The third screen 1803 may also include a screen in which displaying of the content C is suspended, a locked screen, an empty screen, or an AOD screen.

In response to the area in which the content B is displayed being located at the second side, a fourth screen 1804 may be displayed on the first side and a fifth screen 1805 may be displayed on the second side. The fourth screen 1804 may include a second icon 1820 for the content B in addition to the first icon 1810. The second icon 1820 may be displayed in response to the area in which the content B is displayed being located at the second side. The fifth screen 1805 may include a screen in which a separate layer overlaps the content B and the content C but is not limited thereto. The fifth screen 1805 may also include a screen in which displaying of the content B and the content C is suspended, a locked screen, an empty screen, or an AOD screen.

As illustrated in FIG. 18, on a perimeter of each of the first icon 1810 and the second icon 1820, information on a predetermined period of time calculated in response to a relocation to the second side may be displayed in an area corresponding to the content related to each of the icons. The information on the predetermined period of time may include, for example, an image representing an amount of time (e.g., three seconds) that elapses from a point in time at which the area related to each of the icons is located at the second side in the predetermined period of time (e.g., ten seconds). When the predetermined period of time elapses without receiving an input to the icon, displaying of the icon and an application corresponding to the icon may be terminated. For example, when an input to the first icon 1810 is not received until the predetermined period of time elapses since the first icon 1810 is displayed, an application providing content related to the first icon 1810, that is, the content C displayed on the second side may be terminated. Accordingly, the content C may not be displayed on the second side. When the first icon 1810 and the second icon 1820 have different points in time for starting calculation of the predetermined period of time, applications related to the first icon 1810 and the second icon 1820 may be terminated at different points in time.

Referring to FIG. 18, the first icon 1810 and the second icon 1820 may be arranged in parallel in response to the contents corresponding to the first icon 1810 and the second icon 1820 being arranged in parallel.

Referring to FIG. 19, content A, content B, and content C may be displayed on a first screen 1901 in a display-extended state. The content B and the content C may be arranged vertically. In this case, in response to a size reduction of a display, at least a portion of the content B and at least a portion of the content C may be arranged at a second side together.

In response to at least a portion of the content B and at least a portion of the content C being arranged at the second side together, a first icon 1910 corresponding to the content B and a second icon 1920 corresponding to the content C may be displayed together. For example, a second screen 1902 including the first icon 1910 and the second icon 1920 may be displayed on a first side.

In response to the second screen 1902 being displayed, a third screen 1903 may be displayed on the second side. The third screen 1903 may include a screen in which a separate layer overlaps the content B and the content C but is not limited thereto. The third screen 1903 may also include a screen in which displaying of the content B and the content C is suspended, a locked screen, an empty screen, or an AOD screen, for example.

As illustrated, information on a predetermined period of time may be displayed on perimeters of the first icon 1910 and the second icon 1920. In the example of FIG. 19, since each icon has the same point in time for starting calculation of the predetermined period of time, the same information may be displayed on the perimeters. If an input to at least one of the first icon 1910 and the second icon 1920 is not received within the predetermined period of time, displaying of the first icon 1910 and the second icon 1920 may be terminated and applications related to the icons may also be terminated.

When an input to the first icon 1910 or the second icon 1920 is received within the predetermined period of time, content corresponding to an icon to which the input is applied may be displayed in an area corresponding to the received input. In this case, displaying of other icons to which an input is not applied and applications related to the other icons may be terminated. However, it is merely an example, and the other icons may be continually displayed until the predetermined period of time elapses depending on a case.

Figure 20:
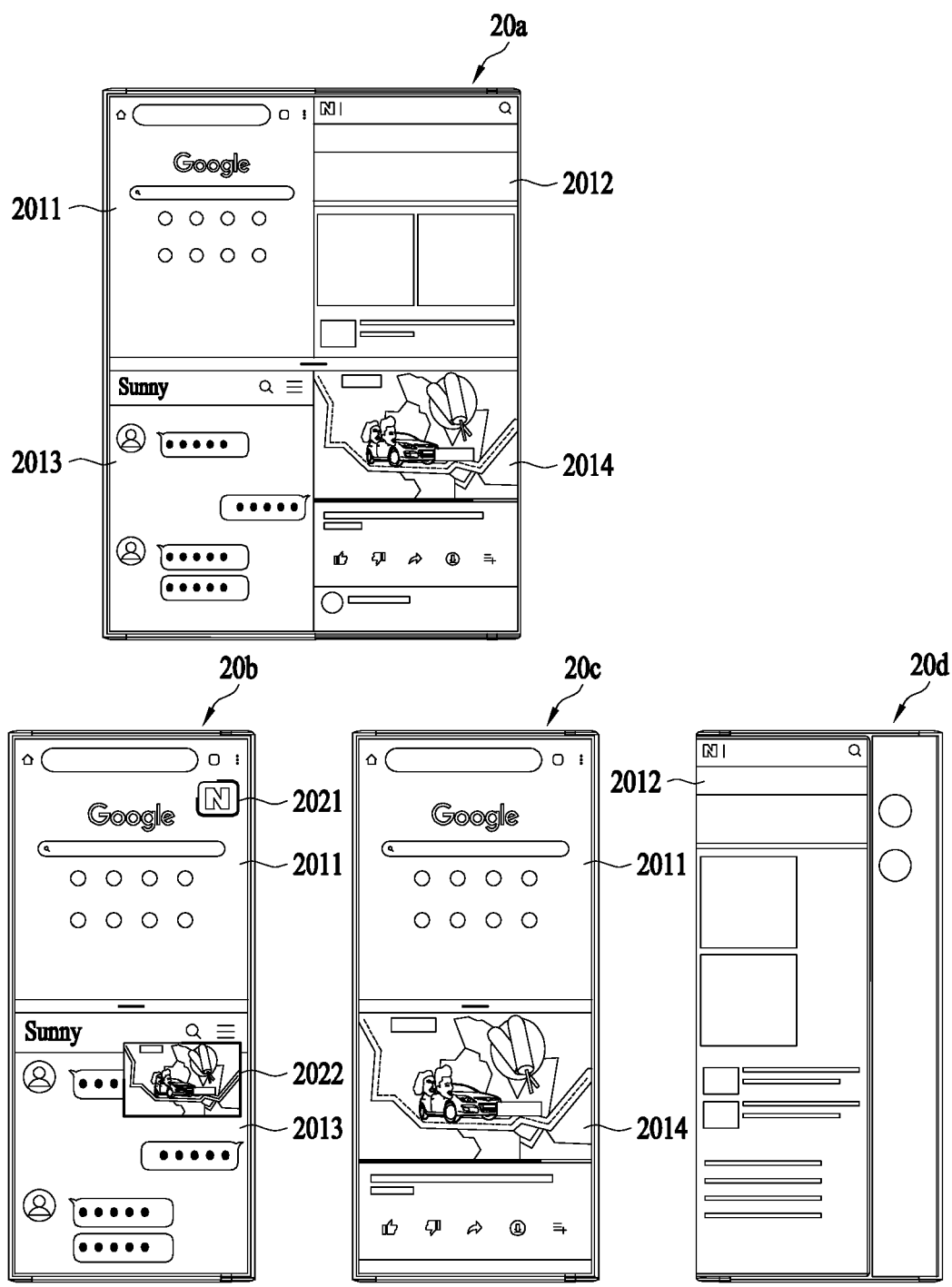
FIGS. 20 and 21 illustrate screens displayed on a mobile terminal according to an example embodiment of the present disclosure.
Figure 21:
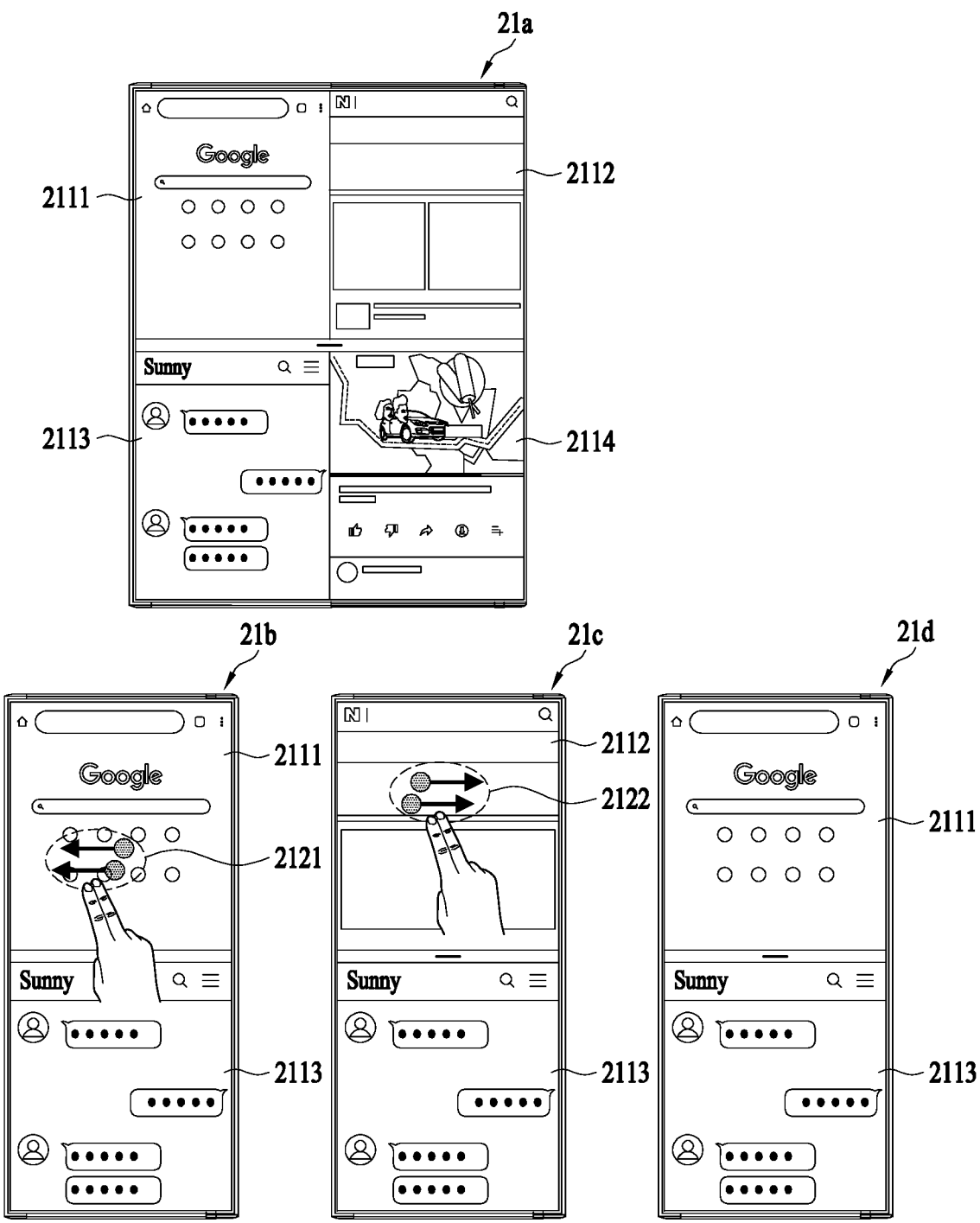

FIGS. 20 and 21 illustrate screens displayed on a mobile terminal according to an example embodiment of the present disclosure. Specifically, FIG. 20 illustrates a mobile terminal that displays an icon in response to predetermined content being arranged on a second side and controls displaying of the predetermined content based on an input applied to the icon. FIG. 21 illustrates a mobile terminal that controls displaying of predetermined content based on an input applied after the predetermined content is arranged on a second side.

Reference numerals 20*a*, 20*b*, and 20*c* of FIG. 20 show a first side (e.g., a front side) of the mobile terminal. Reference numeral 20*d* of FIG. 20 shows a second side (e.g., another side) of the mobile terminal. As indicated by the reference numeral 20*a*, based on a plurality of applications being executed, content for each of the plurality of the applications may be displayed on the first side. Specifically, on the first side, first content 2011 associated with a first application, second content 2012 associated with a second application, third content 2013 associated with a third application, and fourth content 2014 associated with a fourth application may be displayed.

Based on a size reduction of a display, a first area including the second content 2012 and the fourth content 2014 may be located to another side (e.g., the second side) of the mobile terminal. In this case, as indicated by the reference numeral 20*b*, a second area including the first content 2011 and the third content 2013 may remain and be displayed on the first side. Also, an icon 2021 for content (e.g., the second content 2012) having been displayed in the first area may be displayed on at least a portion of the first side.

Although the reference numeral 20*b* shows the first side on which the icon 2021 is displayed to overlap another content (e.g., the first content 2011) as an example, the present example is not to be taken as being limited thereto. For example, the icon 2021 may be displayed in a separate area. In response to the second content 2012 being arranged on another side, calculation of a predetermined period of time may be started. The predetermined period of time may be a period of time in which displaying of the icon 2021 and the second application are maintained. In this case, information on the predetermined period of time may be displayed. The information on the predetermined period of time may be displayed on a perimeter of the icon 2021 as illustrated but is not limited thereto.

In response to content being arranged on the other side, at least a portion of the content arranged on the other side or information on the content may be displayed. As indicated by the reference numeral 20*b*, in response to the fourth content 2014 being arranged on the other side, at least a portion of the fourth content 2014, for example, fifth content 2022 may be displayed on the first side.

In some cases, when content arranged on the other side includes a predetermined type of content, the mobile terminal may display at least a portion of the content arranged on the other side, on the first side. The predetermined type may include, but is not limited to, an appreciation type such as a video or image, or a type that requires at least a predetermined period of time for loading content, for example. When the predetermined type includes the appreciation type, at least a portion of content may include a portion corresponding to an image or video included in the content.

Like the aforementioned icons, the fifth content 2022 may be displayed for a predetermined period of time from a point in time at which the fourth content 2014 is arranged on the other side. In some cases, as illustrated, information on the predetermined period of time may be displayed on a perimeter of the fifth content 2022.

The predetermined period of time may vary based on a type of content. For example, when content is a first type, the predetermined period of time may be a first time. Also, when content is a second type, the predetermined period of time may be a second time. In some cases, the first time may be longer than the second time. In such cases, the first type may include a content type that requires at least the predetermined period of time for loading, for example, streaming content such as a video.

The mobile terminal may receive an input to at least one of the icon 2021 and the fifth content 2022. When an input to the icon 2021 is received, the mobile terminal may display content corresponding to the icon 2021, for example, the second content 2012 in an area corresponding to the input. As an example, the mobile terminal may receive a first input to the fifth content 2022. In this example, as indicated by the reference numeral 20c, content corresponding to the fifth content 2022, for example, the fourth content 2014 may be displayed in an area corresponding to the first input.

As another example, when a second input (e.g., an input of swiping the icon 2021 to the right) to the icon 2021 is received, the mobile terminal may display content corresponding to the icon 2021, for example, the second content 2012 on the second side as indicated by the reference numeral 20d. Although not shown, when the first input (e.g., an input of swiping the icon 2021 to the left or a touch input to the icon 2021) to the icon 2021 is received, the mobile terminal may display content corresponding to the icon 2021, for example, the second content 2012 on the first side.

Reference numeral 21a of FIG. 21 may correspond to the reference numeral 20a of FIG. 20. Likewise, first content 2111 of FIG. 21 may correspond to the first content 2011 of FIG. 20, second content 2112 of FIG. 21 may correspond to the second content 2012 of FIG. 20, third content 2113 of FIG. 21 may correspond to the third content 2013 of FIG. 20, and fourth content 2114 of FIG. 21 may correspond to the fourth content 2014 of FIG. 20.

Based on a size reduction of a display, a first area including the second content 2012 and the fourth content 2014 may be located at another side of a mobile terminal (e.g., the second side). In this case, content (or an application associated with the content) corresponding to an area located at the other side may be held on for a predetermined period of time.

For example, when an area including the second content 2112 is located to another side, an execution of an application providing the second content 2112 may be suspended. In this example, when a first input 2121 is applied within a predetermined period of time as indicated by reference numeral 21b, the suspension of the execution of the application may be canceled so that the second content 2112 is displayed again in an area corresponding to the input (for example, an area in which the first content 2111 is displayed on the first side) as indicated by reference numeral 21c. If the predetermined period of time elapses without receiving an input, the application providing the second content 2112 may be terminated.

As indicated by reference numeral 21c, when the second content 2112 is displayed on the first side in response to the first input 2121, the first content 2111 may be obscured by the second content 2112. In this case, as indicated by reference numeral 21d, the first content 2111 may be displayed again on the first side based on a switch input 2122. When the first input 2121 has a predetermined direction, the switch input 2122 may include an input of a direction opposite to that of the first input 2121. However, it is merely an example and the switch input 2122 may include a predetermined input.

When content arranged at another side includes a plurality of contents, the mobile terminal may display at least one of the arranged contents in an area corresponding to the first input 2121 based on the first input 2121 and a position to which the first input 2121 is applied. For example, when the first input 2121 is applied to a portion of the area in which the first content 2111 is displayed as indicated by the reference numeral 21b, the second content 2112 may be displayed in an area corresponding to an area to which the first input 2121 is applied (e.g., the area in which the first content 2111 is displayed) as indicated by the reference numeral 21c. Although not shown, when the first input 2121 is applied to a portion of an area in which the third content 2113 is displayed, the second content 2112 may be displayed in the area in which the third content 2113 is displayed.

Although FIG. 21 illustrates a case in which the first input 2121 is implemented as a swipe input of a left direction, it is merely provided as an example and the first input 2121 may be implemented as various types of inputs.

Figure 22:
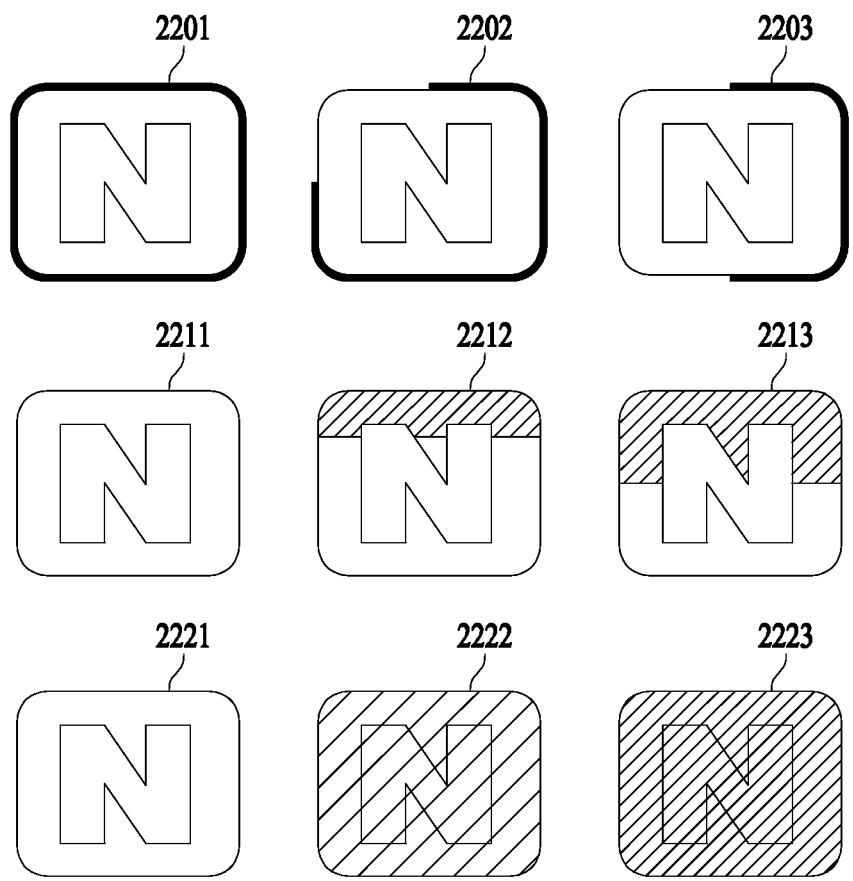
FIGS. 22 and 23 illustrate examples of icons displayed on a mobile terminal according to an example embodiment of the present disclosure.
Figure 23:
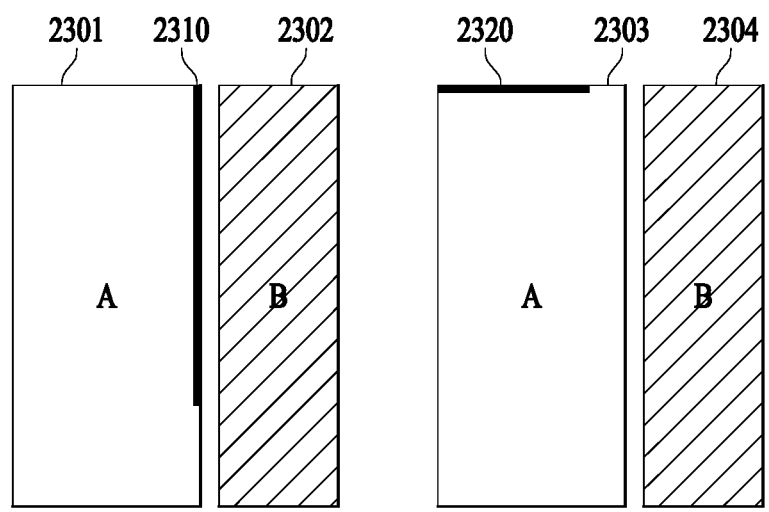

FIGS. 22 and 23 illustrate examples of icons displayed on a mobile terminal according to an example embodiment of the present disclosure. Specifically, FIG. 22 illustrates an example of displaying an icon in association with information on a predetermined period of time. FIG. 23 illustrates an example of displaying an icon separate from information on a predetermined period of time.

Referring to FIG. 22, when an area for displaying first content is located at a second side and calculation of a predetermined period of time starts, an icon related to an application providing the first content may be displayed on a first side as a $(1\text{-}1)^{th}$ state 2201, a $(2\text{-}1)^{th}$ state 2211, or a $(3\text{-}1)^{th}$ state 2221. In other words, at a point in time for starting the calculation of the predetermined period of time, the information on the predetermined period of time may be represented as the $(1\text{-}1)^{th}$ state 2201, the $(2\text{-}1)^{th}$ state 2211, or the $(3\text{-}1)^{th}$ state 2221 in association with the icon.

When the information on the predetermined period of time is displayed as the $(1\text{-}1)^{th}$ state 2201, the $(1\text{-}1)^{th}$ state 2201 may sequentially change to a $(1\text{-}2)^{th}$ state 2202 and a $(1\text{-}3)^{th}$ state 2203 by lapse of time. The $(1\text{-}1)^{th}$ state 2201 represents an icon around which a bar is provided. The bar may gradually disappear over time. When the predetermined period of time elapses, only the icon may remain without displaying the bar.

When the information on the predetermined period of time is displayed as the $(2\text{-}1)^{th}$ state 2211, the $(2\text{-}1)^{th}$ state 2211 may sequentially change to a $(2\text{-}2)^{th}$ state 2212 and a $(2\text{-}3)^{th}$ state 2213 by lapse of time. The $(2\text{-}1)^{th}$ state 2211 may correspond to a basic icon of an application. A color of the icon may gradually change to another color over time.

For example, if the (2-2)$^{th}$ state 2212 corresponds to a point in time at which a quarter of the predetermined period of time has elapsed, the (2-2)$^{th}$ state 2212 may be a state in which about a quarter of the icon is changed in color.

When the information on the predetermined period of time is displayed as a (3-1)$^{th}$ state 2223, the (3-1)$^{th}$ state 2223 may sequentially change to a (3-2)$^{th}$ state 2222 and a (3-3)$^{th}$ state 2223 by lapse of time. The (3-1)$^{th}$ state 2221 may correspond to a basic icon of an application. A brightness or shade of the icon may gradually change over time. As the predetermined period of time elapses, for example, as a state of the icon changes from the (3-1)$^{th}$ state 2221 to the (3-2)$^{th}$ state 2222 and the (3-3)$^{th}$ state 2223, the brightness of the icon may decrease or the shade of the icon may increase.

Referring to FIG. 23, in response to a size reduction of a display, a first screen 2301 or a third screen 2303 may be displayed on a first side. A second screen 2302 may be, for example, a screen displayed on a display located at a second side in response to the first screen 2301 being displayed. A fourth screen 2304 may be, for example, a screen displayed on the display located at the second side in response to the third screen 2303 being displayed.

In response to the size reduction of the display, at least a portion of an area in which content of a first application is displayed may be located at the second side. In this case, displaying of the content of the first application may be suspended for a predetermined period of time or a separate layer may be displayed on the content of the first application for the predetermined period of time. Also, as illustrated in FIG. 23, information 2310 and 2320 on the predetermined period of time may be displayed on the display of the first side, for example, the first screen 2301 or the third screen 2303.

In one example, as shown in the first screen 2301, the information 2310 on the predetermined period of time may be displayed at a position corresponding to a direction in which the display is previously located or a position at which the display is wound due to the size reduction of the display. In another example, as shown in the third screen 2303, the information 2320 on the predetermined period of time may be displayed at a predetermined position such as an upper end of a screen. As such, the information 2310 and 2320 on the predetermined period of time may be information indicating an elapsed time with respect to the predetermined period of time. The information 2310 and 2320 may be displayed as a bar image as illustrated in FIG. 23 but is not limited thereto.

In the present disclosure, in a case in which content displayed on a front side is moved to a rear side due to a size reduction of a display, a mobile terminal and a control method of the mobile terminal may hold the content in a standby state for a predetermined period of time instead of immediately terminating the content so as to quickly display content when a user is to use the content again.

Further, in the present disclosure, a mobile terminal and a control method of the mobile terminal may terminate content and an application providing the content after a predetermined period of time elapses, thereby achieving increased efficiency in driving the mobile terminal.

Further, in the present disclosure, a mobile terminal and a control method of the mobile terminal may determine a position for displaying content based on an input received within a predetermined period of time, thereby appropriately providing the content for use pattern of a user.

According to example embodiments, it is possible to provide a mobile terminal for providing content and a control method thereof. The mobile terminal may display content of an application in an area corresponding to a received input when a display of the mobile terminal is changed in size, thereby reflecting user's needs and achieving increased efficiency in providing content.

According to example embodiments, it is possible to quickly display content in response to a request for re-displaying by holding an application related to the content in a standby state instead of terminating the application even if a content display area is reduced based on a size change of a display.

Effects are not limited to the aforementioned effects, and other effects not mentioned will be clearly understood by those skilled in the art from the description of the claims.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. A mobile terminal comprising:
   a display located at a first side of the mobile terminal and a second side of the mobile terminal facing the first side, such that a size of the display that is located at the first side is changeable; and
   a controller,
   wherein the controller is configured to:
   display first content of a first application at a first area of the display located at the first side, and second content of a second application at a second area of the display located at the first side; and
   in response to a reduction of the size of the display located at the first side:
      arrange at least one portion of the first area of the display on another side of the mobile terminal, wherein the other side is distinct from the first side; and
      display the first content of the first application at at least a portion of the second area in response to receiving a first input related to the first application,
      wherein when the first input is not identified within a predetermined period of time, the controller is further configured to terminate the first application or drive the first application in a background region after the predetermined period of time elapses.

2. The mobile terminal of claim 1, wherein the controller is further configured to suspend displaying at least a portion of the first content in response to the at least one portion of the first area being arranged on the other side.

3. The mobile terminal of claim 1, wherein when the first input is received, the controller is further configured to suspend displaying the second content at the second area.

4. The mobile terminal of claim 1, wherein, in response to the at least one portion of the first area being arranged on the other side, the controller is further configured to display at least one portion of the first content at the at least one portion of the first area and deactivate touch input sensing for the at least one portion of the first area.

5. The mobile terminal of claim 4, wherein the controller is further configured to display a separate layer to overlap the at least one portion of the first content displayed at the at least one portion of the first area or control, to a predetermined value, a brightness of the at least one portion of the first area.

6. The mobile terminal of claim 1, wherein when a second input to the display located at the other side is received, the controller is further configured to display the first content at the display located at the other side.

7. The mobile terminal of claim 6, wherein the controller is further configured to, when the second input is received, deactivate touch input sensing of the display located at the first side.

8. The mobile terminal of claim 1, wherein the controller is further configured to display an icon related to the first application at the display located at the first side in response to the at least one portion of the first area being arranged on the other side, and
wherein the first input includes an input to the icon.

9. The mobile terminal of claim 8, wherein a position for displaying the icon is determined based on a position of the first area.

10. The mobile terminal of claim 8, wherein the first input includes a touch input received within a predetermined period of time after the icon is displayed, and
wherein the predetermined period of time is determined based on a type of the first application or a type of the first content of the first application.

11. The mobile terminal of claim 10, wherein the controller is further configured to further display at least one of at least a portion of the first content, information on the first content, or information on the predetermined period of time, at the display located at the first side.

12. The mobile terminal of claim 1, wherein when the at least one portion of the first area is rearranged on the first side within a predetermined period of time, the controller is further configured to display content of the first application at at least a portion of the first area.

13. The mobile terminal of claim 1, wherein when the at least one portion of the first area is rearranged on the first side after a predetermined period of time elapses, the controller is further configured to display the second content at the first area and at least a portion of the second area.

14. The mobile terminal of claim 1, wherein when the first input is received, the controller is further configured to display the first content at the at least a portion of the second area based on a position at which the first input is received.

15. The mobile terminal of claim 1, wherein the display includes a flexible display having a side located between the first side and the second side and wound on one side of the mobile terminal, and
wherein a size of the flexible display that is located at the first side is changed based on control by the controller.

16. A method of controlling a mobile terminal comprising a display located at a first side of the mobile terminal and a second side of the mobile terminal facing the first side, such that a size of the display that is located at the first side is changeable, the method comprising:
displaying first content of a first application at a first area of the display located at the first side, and second content of a second application at a second area of the display located at the first side; and
in response to a reduction of the size of the display located at the first side:
arranging at least one portion of the first area of the display on another side of the mobile terminal, wherein the other side is distinct from the first side; and
displaying the first content of the first application at at least a portion of the second area in response to receiving a first input related to the first application,
wherein when the first input is not identified within a predetermined period of time, the controller is further configured to terminate the first application after the predetermined period of time elapses.

17. The method of claim 16, further comprising:
suspending displaying at least a portion of the first content in response to the at least one portion of the first area being arranged on the other side.

18. The method of claim 16, further comprising:
in response to the at least one portion of the first area being arranged on the other side, displaying at least one portion of the first content at the at least one portion of the first area and deactivating touch input sensing for the at least one portion of the first area.

19. The method of claim 16, further comprising:
displaying an icon related to the first application at the display located at the first side in response to the at least one portion of the first area being arranged on the other side,
wherein the first input includes an input to the icon.

* * * * *